(12) United States Patent
Lotto

(10) Patent No.: US 11,532,140 B2
(45) Date of Patent: *Dec. 20, 2022

(54) AUDIO CONTENT OF A DIGITAL OBJECT ASSOCIATED WITH A GEOGRAPHICAL LOCATION

(71) Applicant: Ripple, Inc. of Delaware, New York, NY (US)

(72) Inventor: Ray Beau Lotto, Oxford (GB)

(73) Assignee: Ripple, Inc. of Delaware, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/351,912

(22) Filed: Jun. 18, 2021

(65) Prior Publication Data

US 2021/0390786 A1 Dec. 16, 2021

Related U.S. Application Data

(63) Continuation of application No. 16/009,342, filed on Jun. 15, 2018, now Pat. No. 11,069,138, which is a continuation of application No. 14/301,142, filed on Jun. 10, 2014, now Pat. No. 10,026,226.

(51) Int. Cl.
*G06T 19/00* (2011.01)
*H04W 4/02* (2018.01)

(52) U.S. Cl.
CPC .......... *G06T 19/006* (2013.01); *H04W 4/02* (2013.01)

(58) Field of Classification Search
CPC ................ G06T 19/006; H04W 4/02
See application file for complete search history.

(56) References Cited

U.S. PATENT DOCUMENTS 5,613,048 A 3/1997 Chen
5,795,228 A * 8/1998 Trumbull ............. A63F 13/12
463/42

(Continued)

FOREIGN PATENT DOCUMENTS

CA 2690425 10/2010
GB 2507314 4/2014

OTHER PUBLICATIONS

Pielot et al., "PocketNavigator: Vibro-Tactile Waypoint Navigation for Everyday Mobile Devices", MobileHCI'10, Sep. 7-10, 2010 (Year: 2010).

*Primary Examiner* — Phong X Nguyen
(74) *Attorney, Agent, or Firm* — Van Pelt, Yi & James LLP

(57) ABSTRACT

A geographical location of a user device is determined. It is determined that the geographical location of the user device matches a digital element based on a distance difference between the geographical location of the user device and a geographical location of the digital element. In response to the determination that the geographical location of the user device matches the digital element, an indication that the digital element is selectable is provided. A representation of the digital element is provided without providing an auditory content of the digital element prior to the digital element being obtained. A user selection indication that selects the representation of the digital element to obtain the auditory content of the digital element is received. The auditory content of the digital element is provided upon receiving the user selection indication.

20 Claims, 17 Drawing Sheets

(56) References Cited

U.S. PATENT DOCUMENTS

| | | | |
|---|---|---|---|
| 5,943,427 A * | 8/1999 | Massie | H04S 1/007 381/1 |
| 6,037,936 A | 3/2000 | Ellenby | |
| 6,055,048 A | 4/2000 | Langevin | |
| 6,686,918 B1 * | 2/2004 | Cajolet | G11B 27/34 345/473 |
| 7,113,610 B1 | 9/2006 | Chrysanthakopoulos | |
| 7,761,233 B2 | 7/2010 | Schott | |
| 8,473,200 B1 | 6/2013 | Manber | |
| 8,646,062 B2 | 2/2014 | Bouz | |
| 8,688,249 B2 * | 4/2014 | Vernon | H04R 29/00 381/63 |
| 9,569,057 B2 | 2/2017 | Ooka | |
| 9,699,583 B1 * | 7/2017 | Lyren | H04S 7/303 |
| 9,905,053 B2 * | 2/2018 | Yamamoto | G06T 19/006 |
| 10,146,501 B1 * | 12/2018 | Park | G06F 3/017 |
| 10,440,468 B1 * | 10/2019 | Kelley | H04R 17/005 |
| 10,542,369 B2 * | 1/2020 | Miyazawa | H04M 1/6058 |
| 2002/0176636 A1 | 11/2002 | Shefi | |
| 2003/0051255 A1 * | 3/2003 | Bulman | G06Q 40/12 725/135 |
| 2004/0098343 A1 | 5/2004 | Kawaki | |
| 2004/0130525 A1 | 7/2004 | Suchocki | |
| 2006/0192783 A1 * | 8/2006 | Kass | G06T 13/80 345/473 |
| 2006/0250402 A1 * | 11/2006 | Perlin | G06T 13/40 345/474 |
| 2007/0130001 A1 | 6/2007 | Jung | |
| 2007/0162942 A1 | 7/2007 | Hamynen | |
| 2007/0242131 A1 | 10/2007 | Sanz-Pastor | |
| 2007/0257915 A1 | 11/2007 | Kutaragi | |
| 2007/0275691 A1 * | 11/2007 | Boda | H04W 4/029 455/404.2 |
| 2008/0252646 A1 * | 10/2008 | Pelletier | G06T 13/00 345/474 |
| 2008/0292196 A1 * | 11/2008 | Jain | G06F 16/58 382/225 |
| 2009/0141905 A1 | 6/2009 | Warhol | |
| 2009/0227266 A1 | 9/2009 | Baik | |
| 2009/0253512 A1 | 10/2009 | Nickell | |
| 2009/0273513 A1 | 11/2009 | Huang | |
| 2009/0278948 A1 * | 11/2009 | Hayashi | H04N 5/2226 348/E5.024 |
| 2009/0282056 A1 | 11/2009 | Patel | |
| 2010/0004995 A1 * | 1/2010 | Hickman | G06F 3/14 705/14.58 |
| 2010/0023878 A1 * | 1/2010 | Douris | G06F 3/0481 715/757 |
| 2010/0120450 A1 | 5/2010 | Herz | |
| 2010/0208057 A1 * | 8/2010 | Meier | G06T 15/00 345/173 |
| 2010/0262579 A1 | 10/2010 | Brown | |
| 2010/0325563 A1 | 12/2010 | Goldthwaite | |
| 2010/0328344 A1 * | 12/2010 | Mattila | G06F 3/0346 345/158 |
| 2011/0063329 A1 | 3/2011 | Choi | |
| 2011/0098056 A1 | 4/2011 | Rhoads | |
| 2011/0141254 A1 * | 6/2011 | Roebke | G06T 11/00 348/61 |
| 2011/0178705 A1 | 7/2011 | Pakzad | |
| 2011/0188760 A1 * | 8/2011 | Wright | G06T 19/006 382/284 |
| 2011/0238762 A1 | 9/2011 | Soni | |
| 2011/0279453 A1 | 11/2011 | Murphy | |
| 2011/0310227 A1 | 12/2011 | Konertz | |
| 2012/0010853 A1 | 1/2012 | Ploplys | |
| 2012/0086728 A1 * | 4/2012 | Mcardle | G06F 3/0481 345/619 |
| 2012/0134480 A1 | 5/2012 | Leeds | |
| 2012/0143361 A1 | 6/2012 | Kurabayashi | |
| 2012/0200667 A1 | 8/2012 | Gay | |
| 2012/0309518 A1 | 12/2012 | Hansen | |
| 2013/0147840 A1 * | 6/2013 | Seder | G02B 27/01 345/633 |
| 2013/0148811 A1 | 6/2013 | Siotis | |
| 2013/0178257 A1 | 7/2013 | Langseth | |
| 2013/0182070 A1 | 7/2013 | Peters | |
| 2013/0182858 A1 | 7/2013 | You | |
| 2013/0218461 A1 | 8/2013 | Naimark | |
| 2013/0222426 A1 | 8/2013 | Hymel | |
| 2013/0249944 A1 * | 9/2013 | Raghoebardayal | G06T 19/006 345/633 |
| 2013/0251156 A1 * | 9/2013 | Katayama | H04S 3/00 381/17 |
| 2013/0271491 A1 * | 10/2013 | Anderson | G06T 11/60 345/633 |
| 2013/0314402 A1 * | 11/2013 | Furumura | G09G 5/14 345/619 |
| 2013/0314441 A1 | 11/2013 | Grasset | |
| 2014/0028718 A1 * | 1/2014 | Lindner | H04M 1/72403 345/633 |
| 2014/0055491 A1 | 2/2014 | Malamud | |
| 2014/0062900 A1 | 3/2014 | Kaula | |
| 2014/0063055 A1 * | 3/2014 | Osterhout | G06T 19/006 345/633 |
| 2014/0125699 A1 | 5/2014 | Lotto | |
| 2014/0180582 A1 | 6/2014 | Pontarelli | |
| 2014/0218361 A1 | 8/2014 | Abe | |
| 2014/0240452 A1 | 8/2014 | Kasahara | |
| 2014/0282220 A1 | 9/2014 | Wantland | |
| 2014/0300636 A1 * | 10/2014 | Miyazaya | H04R 5/033 345/633 |
| 2014/0357366 A1 | 12/2014 | Koganezawa | |
| 2014/0375683 A1 * | 12/2014 | Salter | G06T 13/20 345/633 |
| 2015/0033159 A1 | 1/2015 | Cho | |
| 2015/0042681 A1 * | 2/2015 | Hart | G06T 19/006 345/633 |
| 2015/0100270 A1 | 4/2015 | Yuen | |
| 2015/0153826 A1 * | 6/2015 | Ballard | H04W 76/10 345/633 |
| 2015/0304531 A1 * | 10/2015 | Rodriguez Garcia | H04N 5/2224 345/419 |
| 2015/0332514 A1 | 11/2015 | Lotto | |
| 2018/0130258 A1 * | 5/2018 | Yamauchi | G06T 11/60 |
| 2018/0157044 A1 * | 6/2018 | Choi | H04R 1/08 |
| 2018/0350344 A1 * | 12/2018 | Zaslow | G06F 40/30 |
| 2020/0296532 A1 * | 9/2020 | Wang | A63F 13/54 |
| 2020/0374648 A1 * | 11/2020 | Robinson | H04R 5/033 |
| 2021/0051148 A1 * | 2/2021 | Parikh | H04L 67/32 |

* cited by examiner

AUDIO CONTENT OF A DIGITAL OBJECT ASSOCIATED WITH A GEOGRAPHICAL LOCATION

CROSS-REFERENCE TO OTHER APPLICATIONS

This application is a continuation of U.S. patent application Ser. No. 16/009,342 entitled AUDIO CONTENT OF A DIGITAL OBJECT ASSOCIATED WITH A GEOGRAPHICAL LOCATION filed Jun. 15, 2018, which is a continuation of U.S. patent application Ser. No. 14/301,142, now U.S. Pat. No. 10,026,226 entitled RENDERING AN AUGMENTED REALITY OBJECT filed Jun. 10, 2014, both of which are incorporated herein by reference for all purposes.

BACKGROUND OF THE INVENTION

The proliferation of digital activity and record keeping, both social and non-social, has drastically increased one's reliance on mobile devices to manage social interaction and personal record keeping. For example, it is common for a user to manage appointments, photos, personal records, and multiple forms of communication from a single smartphone device. As new features are added to mobile devices, new digital interaction patterns are developed. For example, improvements in location positioning technologies have led to the development of route guidance and location-based searching capabilities on mobile devices. As computing and other features of mobile devices continually improve, new digital interaction and record keeping capabilities can be developed to take advantage of the device capabilities.

BRIEF DESCRIPTION OF THE DRAWINGS

Various embodiments of the invention are disclosed in the following detailed description and the accompanying drawings.

DETAILED DESCRIPTION

Figure 1:
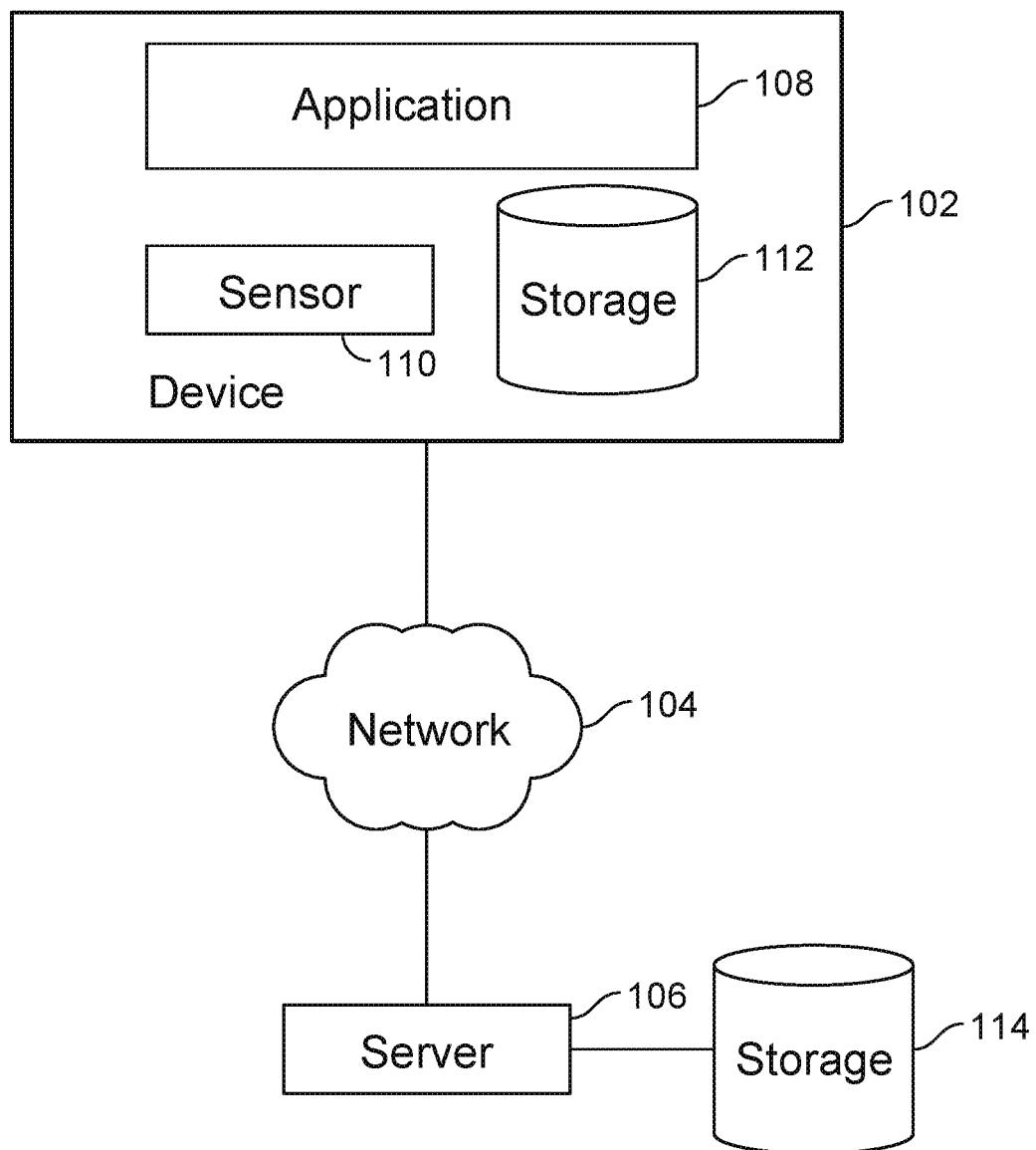
FIG. 1 is a block diagram illustrating an embodiment of a system for rendering a digital element.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering a digital element associated with a physical region is disclosed. For example, a digital element such as a message, a record, a digital file, or a coupon is placed by a user for a specific geographical location. The digital element may be retrieved by one or more users by visiting the geographical location and using a computing device application to retrieve the digital element. In some embodiments, an augmented reality world view is displayed using the computing viewing device and a user desiring to retrieve the digital element may view a visual representation of the digital element at the physical location where the digital element was placed. For example, the user may explore a physical location using a mobile device application as a viewer. If any digital element of interest exists in the physical location shown in the viewer, an icon representing the digital element is superimposed on the view of the physical location to create an augmented reality view of the digital element being located at the physical location. In some embodiments, the representation of the digital element is associated with an audio, tactile and/or other somatosensory feedback. For example, an audio, tactile and/or other somatosensory feedback may be provided via the device to indicate the digital element. If a user desires to obtain the digital element, the user may indicate that the user desires to obtain the digital element shown in the viewer of the mobile device application.

In some embodiments, an augmented reality object is rendered within an augmented reality world environment displayed on a screen. For example, a digital element to render is selected. For example, it is determined that a location and an orientation of a viewing device (e.g., mobile device) meets a criteria to render the digital element on a screen. A heading value of the digital element is determined based at least in part on a determined geographical location of an observing platform. For example, a compass directional heading from the geographical location of the viewing platform to the geographical location of the digital element is determined. A captured image associated with the geographical location of the device is obtained. For example, image captured by a camera at the geographical location is obtained to be displayed as the augmented reality world environment. The digital element is rendered on the captured image at least in part by using the heading value. For example, the captured image includes an image of a range of directions around a center directional heading and a visual representation of the digital element is rendered over the captured image at the heading value that corresponds to its position in the range of directional headings captured by the image.

FIG. 1 is a block diagram illustrating an embodiment of a system for rendering a digital element. Device 102 is connected to server 106 via network 104. Device 102 may include one or more of the following: a smartphone, a tablet computer, a mobile device, a media player, a virtual reality display device, a head-mounted display, an optical head-mounted display, a wearable device, a wearable computer, a laptop computer, a desktop computer, and any other computing device. Device 102 includes application 108, sensor 110, and storage 112. In some embodiments, device 102 is used by a user to place and/or retrieve a digital element. Application 108 may include a software application that can be utilized to place, retrieve, and/or open a digital element. In some embodiments, application 108 includes a web browser. In some embodiments, application 108 includes a native application (e.g., Apple iOS application or Google Android application) for placing and/or retrieving a digital element. Sensor 110 may include one or more sensors: a location sensor, a Global Positioning System (GPS) sensor, a wireless local area (Wifi) network sensor, accelerometer, a gyroscope sensor, a device orientation sensor, a light sensor, a camera, a proximity sensor, a touch input sensor, and a microphone. In some embodiments, information from the sensor is used to place, retrieve, and/or display a digital element. For example, a current location and orientation of device 102 is obtained from sensor 110 and this information is used to determine which digital element to render on a screen of device 102.

In some embodiments, storage 112 stores configuration information, preferences, content, cached information, a list/database, and/or other information associated with one or more digital elements. For example, storage 112 includes user configuration information and a cached database of digital elements located near device 102. In some embodiments, device 102 provides an augmented reality view displayed on a screen (e.g., a touch input display) of device 102. For example, an environment such as an image captured by a camera (e.g., sensor 110) of device 102 is modified to include a visual, sonic (e.g., audio), and/or somatic (e.g., tactile) representation of a digital element placed at a physical location depicted in the captured image.

In some embodiments, the location where the digital element is placed on the captured image is determined using a detected location of device 102. For example, a geographical location of device 102 is determined at least in part by using sensor 110 and the relative location of the digital element with respect to the device is calculated. Using the calculated relative location, the digital element is rendered on an augmented reality view displayed on a screen of device 102. For example, the digital element is associated with a geographical location coordinate and a heading (e.g., compass degree), and a distance between the detected location of device 102 and the location coordinate of the digital object is calculated. Using the heading and distance, the digital object may be rendered on a display of device 102 when a field of view of an augmented reality view displayed on the display includes the heading of the digital object (e.g., size of digital object may be scaled using the distance).

The detected location of device 102 may be unstable and change over time due to errors and limitations of using sensor 110 to detect the location. When the detected location is fluctuating even though the device is stationary, a digital element may seem to move around erratically in the augmented reality environment due to the changing relative location of the device with respect to a geographical location coordinate where the digital object is located. In order to stabilize the appearance of the digital object's perceived location yet allow for intended movement of the device to be accurately registered, a detected location of device 102 may be filtered to reduce the relative rate of change in motion of the digital object in the augmented reality environment. For example, the digital object is only allowed to move at most at a maximum predetermined rate. In another example, one or more previous consecutively detected locations of device 102 are averaged with the new location to determine an averaged new location that is utilized to determine a filtered new relative position.

A user may navigate the augmented reality view by moving device 102 (e.g., augmented reality observing platform) in the physical world and a corresponding view of the physical world captured by the camera of device 102 is augmented with visual, audio, tactile (e.g., haptic feedback) and other somatosensory representations of digital elements at appropriate locations and displayed on a screen of device 102. In some embodiments, rather than using images from a camera of device 102 to display the augmented reality world, a previously captured image and/or a virtual image may be utilized. In some embodiments, a user may retrieve/capture a digital element by performing a gesture with device 102 at an appropriate physical location by performing an input movement (e.g., touch detected on a touch screen of device 102 or a specific physical movement of device 102 detected by sensor 110).

In some embodiments, because the rendered location of the digital element may be unstable and change over time due to errors and limitations of using sensor 110 to detect the device location, a digital object rendered on an augmented reality view displayed on a display of device 102 may be biased to remain on the display. For example, if a calculated heading of the digital object meets a criteria (e.g., heading of the digital object is within a preset range of a center heading of a field of view of the augmented reality view), the rendered location (e.g., heading) of the digital object is biased using a center heading of a field of view of the augmented reality view displayed on device 102.

In some embodiments, a user may retrieve/capture a digital element by hovering over the digital object for a preset amount of time. For example a center of a display of device 102 displays a target selection area (e.g., cross hairs) and when the digital object is aimed in the target selection area for at least a predetermined amount of time, the digital object is retrieved/captured. In some embodiments, because the rendered location of the digital element may be unstable and change over time due to errors and limitations of using sensor 110 to detect the device location, it may be difficult to aim and maintain the digital object within the target selection area. In some embodiments, a digital object rendered on an augmented reality view displayed on a display of device 102 may be biased to remain within a target selection area if the digital object is placed within the target area. For example, if a calculated heading of the digital object meets a criteria (e.g., heading of the digital object is within a preset range of a center heading of a target area of a field of view of the augmented reality view displayed on a screen of a viewing device), the rendered location (e.g., heading) of the digital object is biased using a heading pointed by the view device (e.g., heading pointed by orientation of device 102).

In some embodiments, a user may retrieve/capture a digital element by touching and/or holding (e.g., for a predetermined amount of time) the digital object on a touch input screen of the device. For example, a user may touch a rendered digital object on a display of device 102 to retrieve/capture the digital object. In some embodiments, because the rendered location of the digital element may be unstable and change over time due to errors and limitations of using sensor 110 to detect the device location, it may be difficult to aim and touch a fast moving digital object. In some embodiments, a digital object rendered on an augmented reality view displayed on a display of device 102 may be prevented from moving away from the display if the digital object is currently displayed on the display.

Server 106 may include a web server, a virtual server, and/or any other server that can provide information to device 102. In some embodiments, device 102 obtains information from server 106 via network 104. In some embodiments, application 108 communicates with server 106 to obtain one or more digital elements located near a location detected by sensor 110. For example, a location detected by sensor 110 is provided to server 106 and server 106 provides a list of digital elements (e.g., obtained from storage 114) that are located near the location and allowed to be accessed by a user of device 102. Device 102 renders a visual representation of the digital elements at appropriate locations within an augmented reality world view. When a user of device 102 selects a specific digital element, device 102 requests the specific digital element and the requested digital element is provided by server 106 from storage 114 and/or from a cached or local storage such as storage 112. Storage 114 is connected to server 106. Storage 114 may store user account information, digital elements, metadata associated with digital elements, and/or any other information associated with digital elements. For example, storage 114 includes a database repository of digital elements. In some embodiments, when a digital element is placed at a physical location using device 102, the digital element is provided to server 106 for storage in storage 114. In some embodiments, one or more placed digital elements may be private (e.g., only stored in storage 112) to device 102 and not provided to server 106 for storage. In some embodiments, storage 114 is directly connected to network 104 and server 106 may access storage 114 via network 104.

Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple devices may be communicating with multiple servers that may be utilizing a cluster of server storage. Additional applications may be hosted by device 102. Components not shown in FIG. 1 may also exist.

Figure 2:
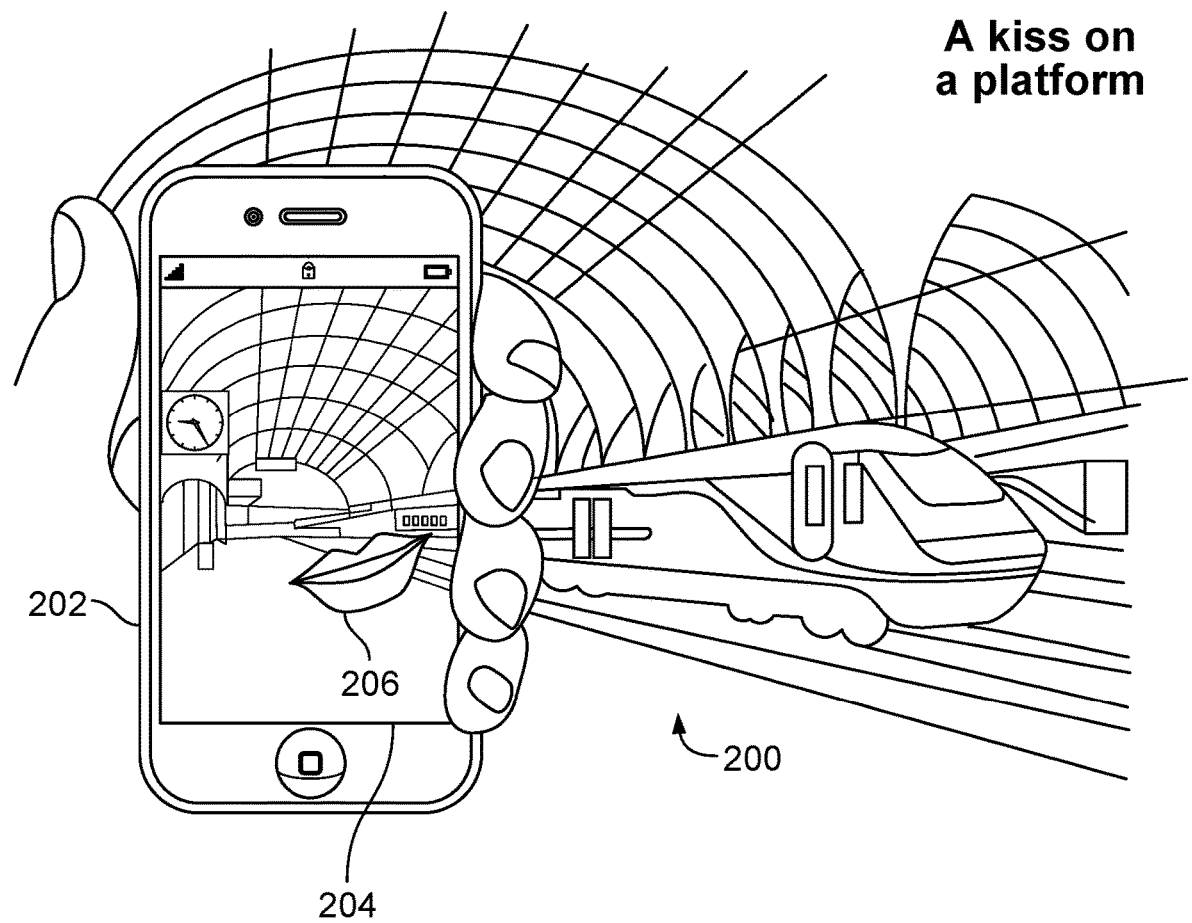
FIG. 2 is a diagram illustrating an embodiment of a rendered visual representation of a digital element.

FIG. 2 is a diagram illustrating an embodiment of a rendered visual representation of a digital element. Device 202 is a smartphone device. In some embodiments, device 202 is included in device 102 of FIG. 1. Device 202 includes screen 204 showing an augmented reality view of environment 200. Specifically, screen 204 is showing a train station platform and the view of the train station platform has been augmented with a display of a visual representation of digital element 206 placed at a physical location of the train station platform. A user may have discovered digital element 206 by moving device 202 around environment 200. As device 202 is moved around environment 200, display 204 displays a view of environment 200. The view of environment 200 may have been obtained from a camera of device 202 and/or a previously captured/generated visual image. Digital element 206 was placed at the physical location by a user. The same or different user may obtain digital element 206 by visiting the physical location and finding the device through a display of a device, as shown in FIG. 2. Digital element 206 is represented by a graphical "kiss" icon.

In order to obtain the digital element 206 displayed on screen 204, a user may perform a gesture with device 202. For example, a user may be required to swing device 202 in a semicircular motion to act out capturing digital element 206 displayed on screen 204. In some embodiments, when digital element 206 is obtained, a message associated with digital element 206 may be obtained. For example, digital element 206 represents a text message left for a user of device 202 by another user that has previously visited the physical location of digital element 206. In some embodiments, although a visual representation of a digital element can be seen on a display viewer screen, the digital element may not be able to be obtained until the device is closer to a location of the digital element. For example, as the device is moved closer to the location of the digital element, a visual representation of the digital element becomes larger. In some embodiments, when the digital element is able to be obtained, an indication is provided. For example, the visual representation may blink, move, wiggle, glow, pulsate, and/or change color to indicate that the element can be obtained. In some embodiments, device 202 may vibrate and/or emit a sound to indicate that the element can be obtained.

Figure 3:
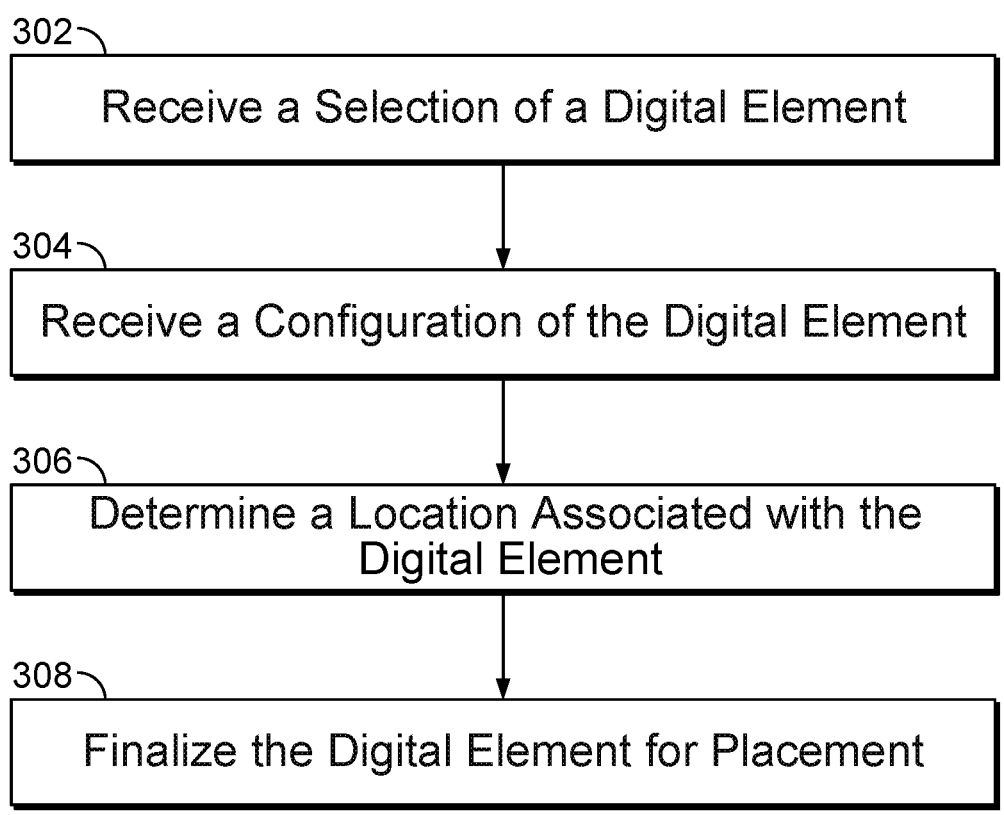
FIG. 3 is a flowchart illustrating an embodiment of a process for placing a digital element.

FIG. 3 is a flowchart illustrating an embodiment of a process for placing a digital element. The process of FIG. 3 may be implemented on device 102 and/or server 106 of FIG. 1. At 302, a selection of a digital element is received. In some embodiments, receiving the selection of the digital element includes receiving an indication of a digital element to be placed. Examples of the digital element include one or more of the following: a text, a message, an image, an audio, a video, a route, a location identifier, a link, an icon, a coupon, a key, a geographical reference, a file, a promotion, an advertisement, a monetary object, and an interactive element. For example, a user may select to leave a message for another user. In another example, a user may select to leave a personal record to remember about a particular location. In another example, a user may select to leave a clue and/or a digital key that can be used to determine/access content in a scavenger hunt. In another example, a user may select to leave a coupon that can be redeemed to obtain a specified item from a merchant. In another example, a user may select to leave an interactive element that guides a receiver of the digital element to one or more locations (e.g., tour, on-screen guidance, an arrow, on-screen bird that a user can follow by physically moving to a location on a flight path of the on-screen bird, etc.). In various embodiments, a digital element may be utilized to provide one or more of the following: a guided tour, a game, a gift, record a memory, record an event at a physical location, a coupon, a promotion, an advertisement, an event, an educational experience, an exercise, a checkpoint, a waypoint, and a social experience.

In some embodiments, a user may select a type of digital content from a list of possible digital elements to place. In some embodiments, a user may generate a new type of digital element to place. In some embodiments, a type of digital element that can be left is determined based on one or more factors. For example, only certain type(s) of digital content may be placed at a particular location. Examples of the factors used to determine the type of digital content that can be left include one or more of the following: information obtained from one or more sensors of a user device (e.g., information from sensor 110 of FIG. 1), a status associated with a physical location, a time value, a temperature, a location where the digital content is to be placed, a user preference, a user account setting, a user privilege, a user status, information associated with a user placing the digital element, information associated with an intended recipient of the digital element, other digital elements at or near the physical location, information obtained from an Internet source, and information obtained from a server (e.g., information from server 106 of FIG. 1).

At 304, a configuration of the digital element is received. In some embodiments, the configuration includes a specification of a visual representation of the digital element to be placed. For example, an icon, a color, and a size to be used to represent the digital element may be received. In some embodiments, the configuration includes a specification of one or more configuration parameters specific to the type of digital content to be placed. For example, a text content of a message to be left is received. In another example, a file to be left is received. In another example, a specification of an item, a quantity, and a merchant of a redeemable coupon are received. In some embodiments, the configuration includes a specification of which user(s) may retrieve the digital content to be placed. In some embodiments, a user may specify that the digital content can be retrieved by everyone (i.e., public), only by the user placing the digital content (i.e., private), only by members belonging to one or more specified groups, or only by specified users. In some embodiments, the configuration includes one or more time parameters associated with the digital element. For example, a user may provide a time period when the digital content can be retrieved. In some embodiments, the configuration includes a specification of a restriction on the number of times the digital element can be retrieved. In some embodiments, the configuration includes a specification of how to notify potential receiver(s) of the digital element to be placed. For example, a user is able to send a notification (e.g., email, instant message, SMS, Twitter Tweet, Facebook posting, etc.) of the existence of the digital element to one or more users and configure whether an alert (e.g., vibration, sound, visual alert, other somatosensory alert, etc.) will be provided when a user who is able to retrieve the digital element is near the physical location of the digital element.

At 306, a location associated with the digital element is determined. In some embodiments, the location is at least in part determined to be a current physical location of a device being used to place the digital element. In some embodiments, at least a portion of the location of the digital element to be placed is automatically determined using one or more of the following associated with the device being used to place the digital element: GPS data, an Internet Protocol (IP) address, a Wifi positioning data, a cellular signal positioning data, a captured image (e.g., machine vision utilizing visual pattern matching to determine location), a captured audio, and a user provided location identifier. In some embodiments, the digital element is only allowed to be placed at the physical location of the device being used to place the digital element. In some embodiments, the digital element may be placed within a geographical boundary associated with the device being used to place the digital element. For example, the digital element may be placed within a specified distance from the location of the device. In some embodiments, the digital element may be placed in any location regardless of the device location. In some embodiments, the digital element may be placed at a location specified by a user. For example, a user may select a location from a map where the digital element is to be placed. In some embodiments, a user may specify a location within an environment view displayed on the device. For example, a user may select a location in an image captured by a camera on the device. In some embodiments, the location of the digital element includes a location point. In some embodiments, the location of the digital element includes a region. In some embodiments, the location associated with digital element is dynamically modified. For example, a region associated with the digital element becomes smaller and/or larger based at least in part on a time value, an elapsed time, a number of times the digital element has been obtained, and/or any other changing factor. In some embodiments, the location of the digital element includes a specification of one or more of the following: a latitude, a longitude, an elevation, a region shape, and a region.

At 308, the digital element is finalized for placement. In some embodiments, finalizing the digital element includes associating the provided digital element with the determined location to enable one or more users to retrieve the digital element from the location. In some embodiments, finalizing the digital element for placement includes storing the digital element and/or metadata associated with the digital element in a storage such as storage 112 and/or 114 of FIG. 1. In some embodiments, finalizing the digital element for placement includes receiving at a server from a user device the digital element and/or metadata associated with the digital element. In some embodiments, finalizing the digital element for placement includes associating the digital element with one or more user accounts. For example, the digital element is associated with an identifier that identifies a user account of a user that created the digital element and one or more other identifiers identify user account(s) of one or more other users that are able to access the digital element.

Figure 4A:
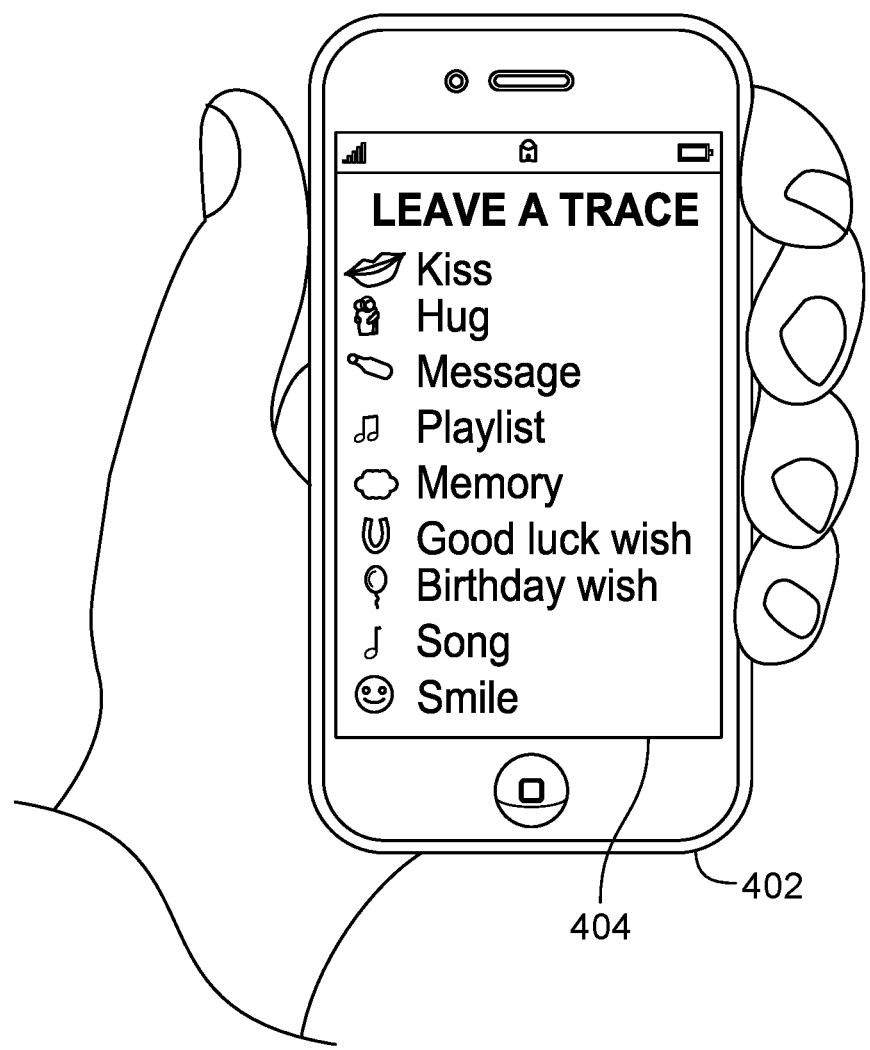
FIGS. 4A-4E are diagrams illustrating an example user interface used to place a digital element.
Figure 4B:
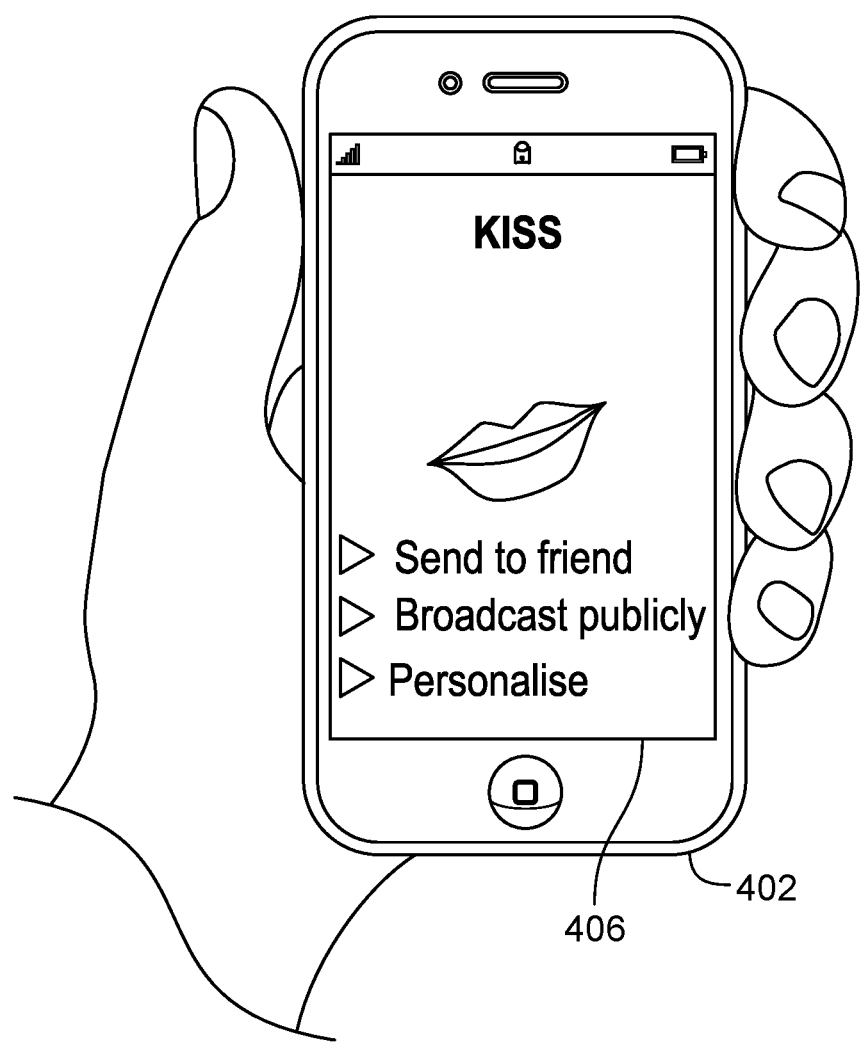
Figure 4C:
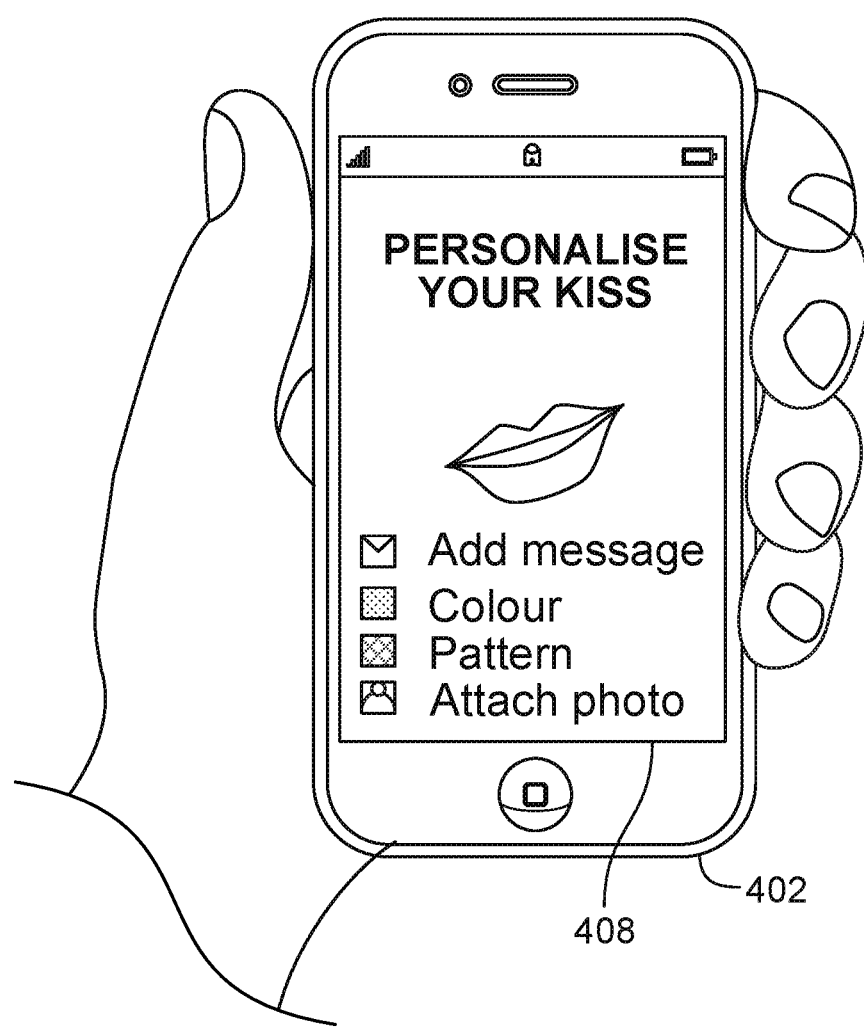
Figure 4D:
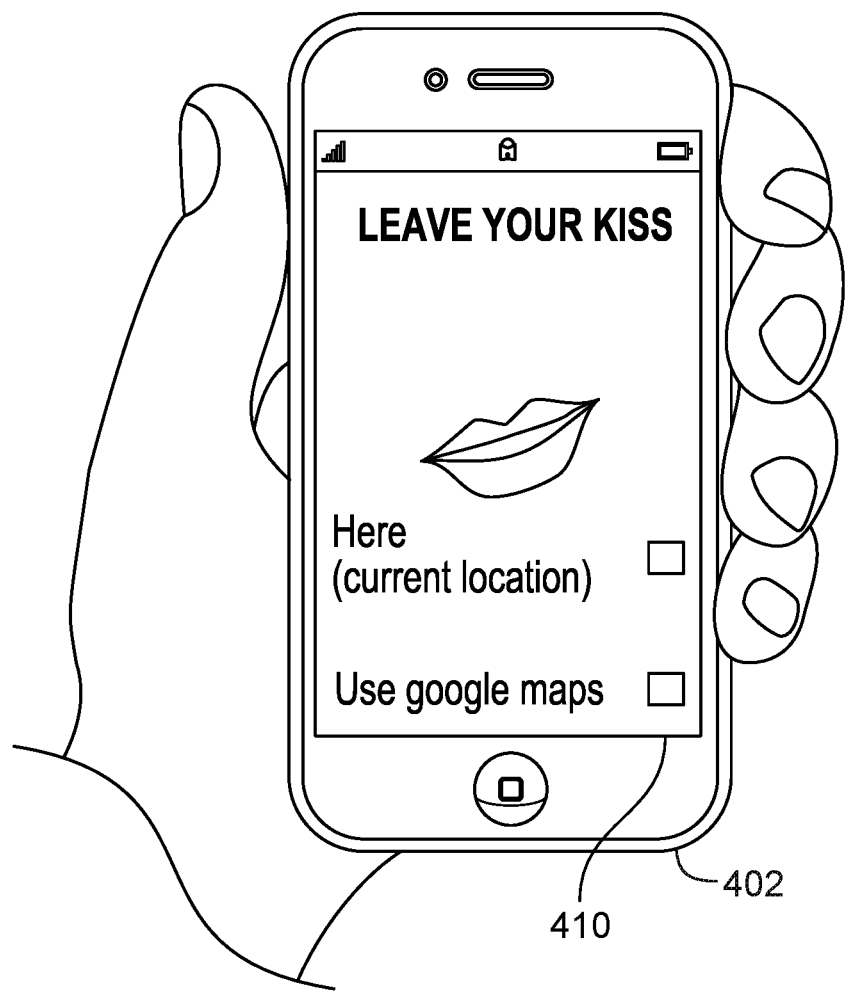
Figure 4E:
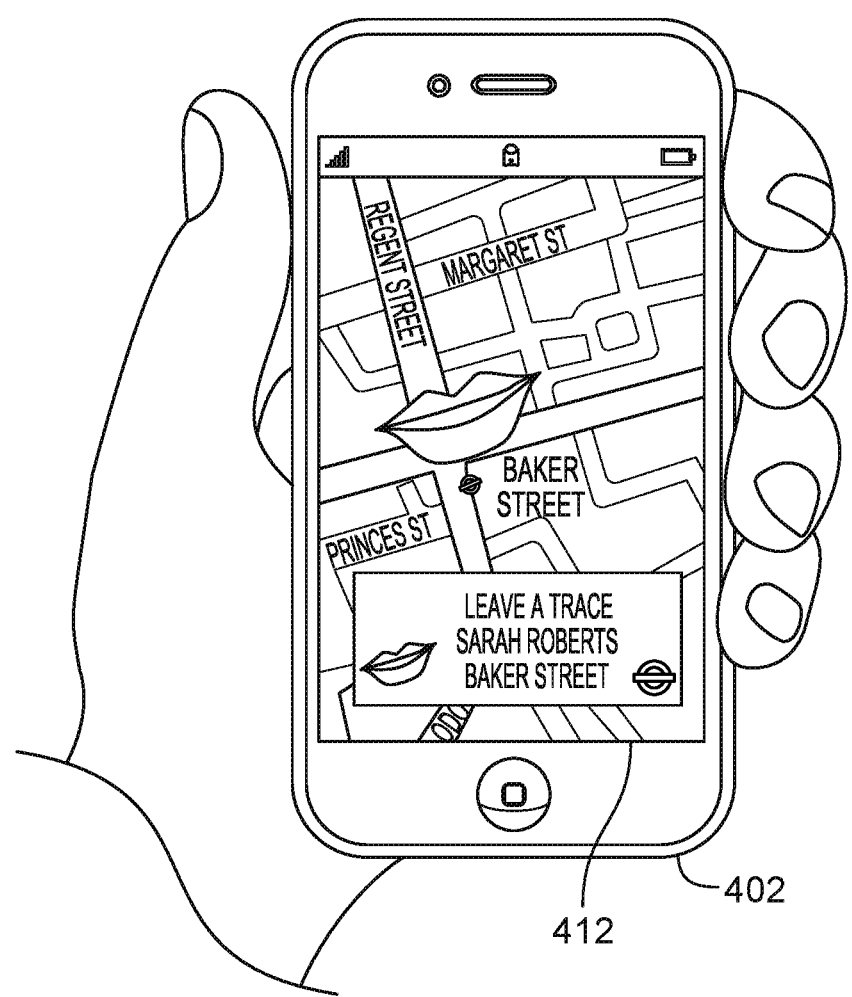

FIGS. 4A-4E are diagrams illustrating an example user interface used to place a digital element. In some embodiments, FIGS. 4A-4E illustrate at least a portion of the process of FIG. 3. FIG. 4A shows a user holding device 402 that is running an application that can be used to place a digital element. In some embodiments, device 402 is device 102 of FIG. 1. Screen 404 is displaying a list of types of digital elements that can be placed. FIG. 4B shows screen 406 that is displaying a configuration screen after a "KISS" type of digital element has been selected by a user on screen 404 of FIG. 4A. The "KISS" type of digital element may be configured to be sent to one or more selected users by selecting the "Send to friend" option on screen 406. The "KISS" type of digital element may be configured to be publicly available to any user by selecting the "Broadcast publicly" option on screen 406. The "KISS" type of digital element may be personalized by selecting the "Personalise" option on screen 406. FIG. 4C shows screen 408 that is displaying personalization options after the "Personalise" option was selected on screen 406 of FIG. 4B. The "KISS" digital element may be personalized by adding a personal text message (e.g., by selecting the "Add message" option), changing the color of the visual representation of the digital element (e.g., by selecting the "Colour" option), changing the shading pattern of the visual representation of the digital element (e.g., by selecting the "Pattern" option), and a personal photograph may be attached to the "KISS" digital element (e.g., by selecting the "Attach photo" option). After the digital element has been configured and personalized, FIG. 4D shows screen 410 that is displaying options to determine a physical location associated with the digital element. By selecting the "Here" option, a geographical location of the device may be automatically determined (e.g., using GPS, Wifi, and/or Cellular signal location data) and associated with the digital element. By selecting the "Use google maps" option, a geographical location of the device may be provided by a user by selecting a location on a displayed map. FIG. 4E shows screen 412 confirming the placement of the digital element after the location of the digital element has been determined. Screen 412 confirms that the "KISS" digital element has been placed at "Baker Street Station" by user "Sarah Roberts."

Figure 5:
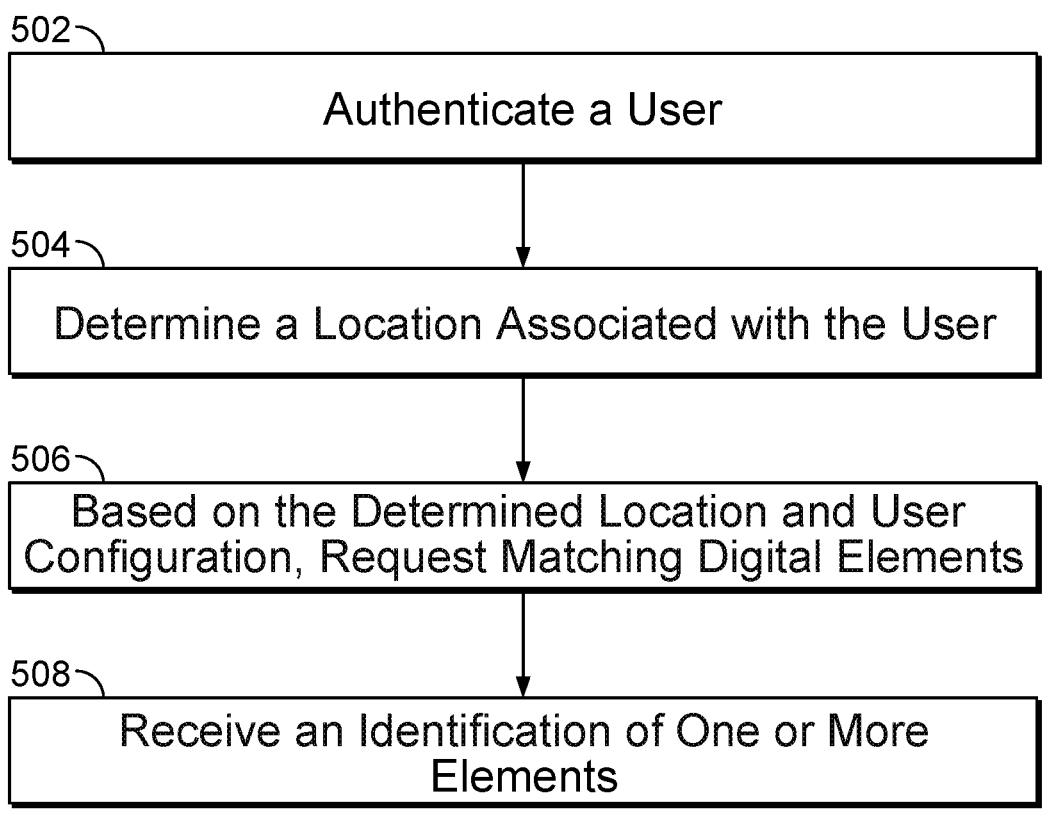
FIG. 5 is a flowchart illustrating an embodiment of a process for retrieving a digital element.

FIG. 5 is a flowchart illustrating an embodiment of a process for retrieving a digital element. In some embodiments, at least a portion of FIG. 5 is used to retrieve a digital element left using at least a portion of the process of FIG. 3. The process of FIG. 5 may be implemented on device 102 of FIG. 1.

At 502, a user is authenticated. In some embodiments, authenticating the user includes verifying a user account identifier and a password. For example, a user executes application 108 and provides a user identifier and a password to log into one or more services of server 106 of FIG. 1. In some embodiments, authenticating the user includes sending a user account identifier and password to a server and receiving verification that the user account has been authenticated. In some embodiments, the user account is associated with one or more preferences/configurations and the preferences/configurations associated with the authenticated user are obtained from a storage such as storage 112 and/or storage 114 of FIG. 1. For example, the user account is associated with a user configuration of desired digital elements (e.g., desired digital elements to be notified when physically near the digital elements), allowed digital elements (e.g., digital elements allowed to be obtained by the user of the user account), and/or one or more other associated users (e.g., user has access to one or more digital elements placed by friend users or other allowed users). In some embodiments, a user may subscribe to digital elements of another user. For example, a celebrity user may make the celebrity user's digital element public and allow a subscribing user access to the celebrity user's digital elements and is notified of the celebrity user's digital elements.

At 504, a location associated with the user is determined. In some embodiments, determining the location includes determining a physical location of a device that is to be used to obtain a digital element. For example, determining the physical location includes determining the physical location of device 102 of FIG. 1. In some embodiments, determining the location includes automatically determining a location using one or more of the following: GPS data, an IP address, a Wi-Fi positioning data, a cellular signal positioning data, a captured image (e.g., machine vision utilizing visual pattern matching to determine location), a captured audio, and a user provided location identifier. In some embodiments, a user may specify a location identifier. For example, a user may select a location from a map. In some embodiments, the location cannot be specified by a user and must be determined using detected information. In some embodiments, determining the location includes at least in part detecting a location and at least in part receiving a user provided location identification. For example, a general location is detected using one or more location sensors and a user is provided a plurality of possible locations within the general location for selection. In some embodiments, determining the location includes using information from sensor 110 of FIG. 1. In some embodiments, determining the location includes utilizing a location service provided by an operating system. For example, an operating system of device 102 of FIG. 1 provides a location identifier determined using one or more sensors of device 102. The provided location may be already processed to minimize errors of the location. For example, the operating system may provide a location that has been already processed using dead reckoning. Despite this and other processing, the provided location may be unstable and fluctuate due to detection errors. In some embodiments, determining the location associated with the user includes averaging a predetermined number of last consecutively detected/received location identifiers (e.g., average last five location coordinates received at a periodic interval from a location service).

At 506, based on the determined location and user configuration, matching digital elements are requested. In some embodiments, using the user configuration associated with the authenticated user in 502 and location determined in 504, a request is made to obtain a list of digital elements that match a desired criteria. For example, the user configuration includes an identification of one or more types, users, distance values, and/or other filters/preferences associated with digital elements desired by a user. The determined location may be used to identify relevant digital elements that are near the determined location (e.g., within a predetermined, user configured, and/or dynamically determined distance from the determined location). In some embodiments, requesting the matching digital elements includes sending the request to a server such as server 106 of FIG. 1. In some embodiments, requesting the matching digital elements includes obtaining a list of matching digital elements from a storage such as storage 112 and/or storage 114 of FIG. 1. In some embodiments, matching digital elements are requested based on the determined location and a user identifier. For example, any digital element within a predetermined, configured, and/or dynamically determined distance from the determined location that is allowed to be received by a user of the user identifier is requested.

At 508, an identification of one or more elements is received. In some embodiments, receiving the identification includes receiving a list of one or more elements that match a criteria. In some embodiments, the identification identifies digital elements that match information provided in 506. For example, the identification includes a list of obtainable digital elements that are located within a predetermined, configurable, and/or dynamically determined distance from the provided location. In some embodiments, the identification only identifies digital elements that are allowed to be obtained by an identified user. For example, a provided user identifier is used to obtain user account information and the user account information (e.g., user preferences, associated users, other/previous digital elements placed/obtained by the user, etc.) is used (e.g., by a server) to determine a list of digital elements allowed to be accessed by the user. In some embodiments, the identification identifies digital elements based at least in part on a status associated with a determined location and/or a digital element. For example, one or more elements may be obtained a predetermined amount of times and an element may have reached the predetermined limit. In another example, one or more elements may only be obtained at a specified time and the element(s) are identified in the identification if a current time matches the specified time. In another example, one or more elements may only be obtained at a specified weather condition (e.g., specified temperature, precipitation, etc.) and the element(s) are identified in the identification if a current weather of the determined location matches the specified weather condition.

In some embodiments, one or more elements may only be obtained by one or more allowed users and the element(s) are identified in the identification if a user is included in the allowed users. In some embodiments, the identification is received from a storage such as storage 112 and/or storage 114 of FIG. 1. In some embodiments, the identification is received from a server such as server 106 of FIG. 1. In some embodiments, the identification includes content of digital element(s) identified by the identification. In some embodiments, the identification includes metadata associated with the digital element(s) identified by the identification. Examples of the metadata include information about a digital element, a rule defining how and/or when a digital element can be obtained (e.g., time restriction associated with a digital element), information about a visual representation of a digital element (e.g., image/animation to be rendered to display a visual representation of a digital element in an augmented reality view), information about a sonic representation of a digital element (e.g., sound to be rendered to indicate a representation of a digital element in an augmented reality world), information about a somatic representation of a digital element (e.g., tactile/haptic feedback to be rendered to indicate a representation of a digital element in an augmented reality world), and information about a notification associated with a digital element (e.g., vibration, sound notification, or other somatosensory notification, if any, when near a digital element). In some embodiments, one or more digital elements identified in the received identification are selected using one or more user preferences. For example, a user may be only interested in a specified type of digital element. In another example, a user may be only interested in digital element(s) placed by a specific user. In some embodiments, the identification of one or more elements is periodically and/or dynamically received. For example, as a physical location of a device receiving the identification changes and/or as digital elements are updated, updated identification is received as updated and/or at a periodic interval.

In some embodiments, one or more digital elements identified in the identification are associated with a notification. For example, a user of a device may not be actively paying attention to the device and/or an application such as application 108 of FIG. 1 that can be used to obtain digital elements. When the device is physically located within a distance (e.g., a predetermined, configurable, and/or dynamically determined distance) from a location where a digital element identified in the identification is placed, a notification may be provided using the device to alert a user that a digital element of interest is located near the device. Examples of the notification include audio, tactile (e.g., vibration), visual, and other somatosensory notifications. In some embodiments, at least a portion of a configuration on whether and/or how to provide the notification for a particular digital element may be included in the identification received in 508. In some embodiments, at least a portion of a configuration on whether and/or how to provide the notification for a particular digital element may be obtained from a user preference and/or user account information.

Figure 6:
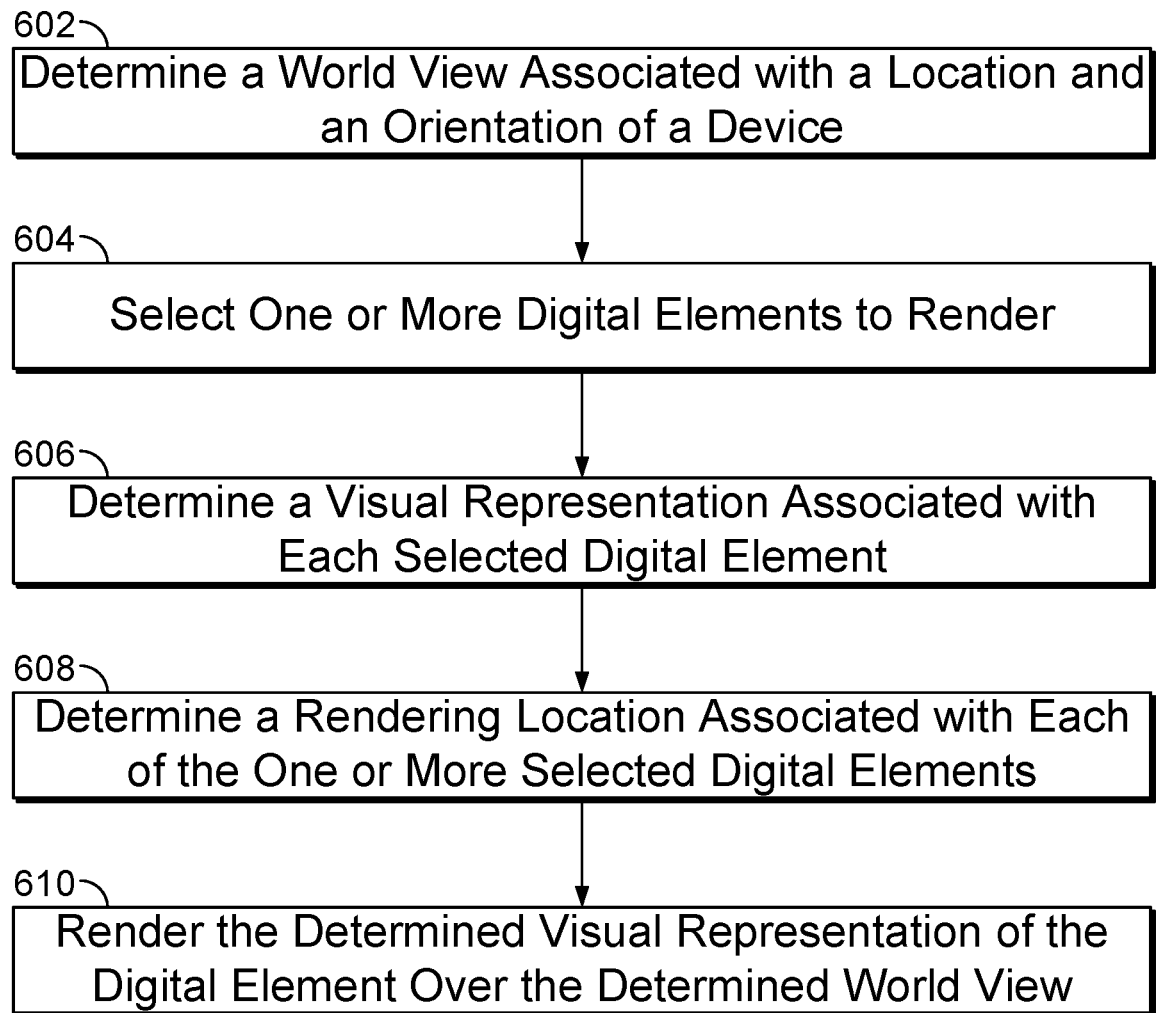
FIG. 6 is a flowchart illustrating an embodiment of a process for rendering a digital element.

FIG. 6 is a flowchart illustrating an embodiment of a process for rendering a digital element. In some embodiments, the process of FIG. 6 is at least in part included in step 508 of FIG. 5. The process of FIG. 6 may be at least in part implemented in device 102 of FIG. 1. In some embodiments, the process of FIG. 6 may be repeated at a periodic interval. In some embodiments, the process of FIG. 6 may be repeated dynamically (e.g., when location of a digital element is changed, when a location of a viewing device is changed, etc.).

At 602, a world view associated with a location and an orientation of a device is determined. In some embodiments, determining the world view includes determining an orientation of the device. For example, a user may navigate an augmented reality world by moving the device in the physical world and a corresponding view of the physical world captured by the camera of the device is augmented with visual, sonic and/or somatic representations of digital elements at appropriate locations and displayed on a screen of the device. In some embodiments, the world view is to be augmented to provide the augmented reality view with a rendered visual, sonic and/or somatic representation of a digital element. In some embodiments, an image captured by a camera (e.g., sensor 110 of FIG. 1) of the device is to be modified to include a visual representation of the digital element placed at a location depicted in the captured image. In some embodiments, rather than using images from a camera of the device to display the augmented reality world, determining the world view that includes obtaining a previously captured image and/or a virtual image may be utilized (e.g., an image matching a current location and orientation of the device).

The detected orientation of the device may be used to determine whether and where a digital element (e.g., placed using the process of FIG. 3) should be rendered on screen of the device. For example, by detecting the orientation and geographical location of the device, the environment being captured by a camera of the device and whether the digital element is located within the captured environment are determined. In some embodiments, determining the orientation of the device includes utilizing one or more sensors (e.g., sensor 110 of FIG. 1) of the device. For example, one or more of the following sensors are utilized to detect the orientation: an accelerometer, a compass, a gyroscope, and an orientation sensor.

In some embodiments, determining the orientation includes determining a horizontal heading/bearing pointed by the orientation of the device. For example, a compass directional bearing (e.g., numerical degree, compass direction, etc.) pointed by a camera of the device (e.g., pointing in the direction perpendicularly away from rear surface of device) in the plane of the earth horizon is determined. In some embodiments, the horizontal heading/bearing of the device is the center horizontal heading/bearing of a world view shown on a display of the device. For example, the horizontal heading/bearing of the device is the horizontal direction pointed by the center of the image captured by a camera of the device.

In some embodiments, determining the orientation includes determining a vertical heading/bearing pointed by the orientation of the device. For example, a vertical directional bearing (e.g., numerical degree, etc.) pointed by a camera of the device (e.g., pointing perpendicularly away from rear surface of device) in the plane perpendicular to the earth horizon is determined. In some embodiments, the vertical heading/bearing of the device is the center vertical heading/bearing of a world view shown on a display of the device. For example, the vertical heading/bearing of the device is the vertical direction pointed by the center of the image captured by a camera of the device. In some embodiments, determining the orientation includes determining a vertical tilt of the device.

At 604, one or more digital elements to render are selected. In some embodiments, selecting the digital elements includes receiving at least a portion of the identification received in 508 of FIG. 5. In some embodiments, the digital element to be rendered is associated with an augmented reality view to be displayed on a screen of a viewing device such as device 102 of FIG. 1. For example, an identification of digital element(s) physically located near the device was received in step 508 of FIG. 5 and stored in a storage such as storage 112 of FIG. 1. A user may utilize the device to display an augmented reality view of the surrounding physical location, and if a digital element identified in the identification is physically located in the location to be displayed in the augmented reality view, the digital element is selected to be rendered. In some embodiments, selecting the digital element includes comparing a detected physical location and orientation of a viewing device with placement locations associated with identified digital elements and selecting one or more digital elements that are within the displayed augmented reality world view (e.g., located within a location depicted in an image captured with a camera of the device).

In some embodiments, one or more digital elements that are located within captured image view are selected from a group of eligible digital elements (e.g., elements received in 508 of FIG. 5) at least in part by using a determined heading/bearing of the device and a field of view of an augmented reality view to be displayed by the device. For example, for each digital element of the group of digital elements, a directional heading/bearing (e.g., horizontal and/or vertical heading/bearings) from a determined location of the device to the digital element is determined, and a digital element is selected to be rendered if a heading/bearing of the digital element is within a field of view range from a heading/bearing pointed by the device (e.g., determined in 602). In some embodiments, each digital element of the group of digital elements is associated with a vertical heading/bearing and/or a tilt in addition to a horizontal heading/bearing. For example, the digital element may be placed at a geographical location (e.g., placed using the process of FIG. 3) specified by a location coordinate that includes a latitude, longitude, and height/altitude components, and a horizontal and a vertical directional heading/bearing of the digital element are determined with respect to a detected location of the device (the digital element is selected to be rendered if the horizontal and vertical headings/bearings of the digital element are within a field of view range from the horizontal and vertical headings/bearings of the device). The height component of the location coordinate of the digital element may be defined as a fixed distance above a detected altitude of the device. For example, all digital elements are placed at a height three feet above a detected altitude of the device.

In another example, the digital element may be placed at a geographical location (e.g., placed using the process of FIG. 3) specified by a location coordinate that includes latitude, longitude, and tilt components (e.g., tilt angle of the device when digital element placed and/or standard tilt angle that is same across all digital elements, etc.), and a horizontal directional heading/bearing of the digital element is determined with respect to a detected location of the device to the location coordinate of the digital element (the digital element is selected to be rendered if the horizontal heading/bearing of the digital element is within a field of view range from a horizontal heading/bearing of the device and a tilt of the digital element is within a field of view range from a detected tilt of the device). The tilt component of the location coordinate of the digital element may be defined as a fixed tilt angle above a zero tilt angle of the device. For example, all digital elements are placed at a 45 degree tilt angle above a zero angle plane parallel to the horizon.

The field of view range may depend on specifications (e.g., angle of view range determined using lens focal length and sensor size) of a camera (e.g., included in sensor 110 of FIG. 1) of the device. In one example, a digital object is located at 160 degrees horizontal bearing direction from the device and the device is pointing towards 150 degrees in the horizontal bearing direction. In this example, the digital object is to be rendered because the camera of the device has a 30 degree horizontal angle of view, which means that the device is able to view+/−15 degrees (i.e., half of angle of view on each side) from the horizontal bearing direction (150 degrees) of the device, and the 160 degrees direction of the digital element is within this range (i.e., within 135-165 degrees range centered around horizontal bearing direction of the device). In the vertical direction, the digital object of the example is located at 50 degrees in the vertical bearing direction and the device is pointing towards 45 degrees in the vertical bearing direction, so the digital object is to be rendered because the camera of the device has a 40 degree vertical angle of view, which means that the device is able to view+/−20 degrees (i.e., half of angle of view on each side) from the 45 degrees vertical bearing direction of the device, and the 50 degrees bearing direction of the digital element is within this range (i.e., within 25-65 degrees range centered around vertical bearing direction of the device).

The field of view range may depend on specifications (e.g., angle of view range determined using lens focal length and sensor size of the camera) of a camera (e.g., sensor 110 of FIG. 1) that captured an image displayed as the augmented reality world environment. The field of view range may depend on the angle of view of an image displayed as the augmented reality world environment. As the viewing device is moved to navigate around the augmented reality environment, different digital elements within the view of the augmented reality environment may be displayed.

At 606, a visual representation associated with the selected digital element is determined. In some embodiments, determining the visual representation includes determining an image and/or animation to be displayed in an augmented reality world view to indicate a presence of a digital element at a location within the augmented reality world view. In some embodiments, at least a portion of the specification of the visual representation is included in the digital element selected in 604. In some embodiments, at least a portion of the specification of the visual representation is included in data received from a server, such as identification data received in step 508 of FIG. 5. The visual representation may include an image, an animation, an icon, a color specification, a size specification, and a notification to provide to indicate the digital element may be obtained. In some embodiments, determining the visual representation includes scaling and/or modifying (e.g., using visual perspective rules) an image/animation representation of the selected digital element based on a relative location of the digital element with respect to a distance and/or orientation of a device to render the visual representation. For example, for each digital element to be rendered, a distance between the digital element and the viewing device is determined and a rendering size of the digital element may be at least in part proportional (e.g., smaller if further away and larger if closer) to the distance. In some embodiments, if a digital element is selected to be rendered, a representation of the digital element may be scaled between a maximum size and a minimum size based on a distance between the digital element and a viewing device.

In some embodiments, a sonic representation associated with the selected digital element is determined. In some embodiments, determining the sonic representation includes determining an audio to be produced in an augmented reality world to indicate a presence of a digital element at a location. In some embodiments, determining the sonic representation includes scaling and/or modifying an audio representation of the selected digital element based on a relative location of the digital element with respect to a distance and/or orientation of a device to render the audio representation. For example, a volume and/or tone of the audio representation may be increased as the digital element is located relatively closer to the device, and the volume and/or tone of the audio representation may be decreased as the digital element is located relatively further away from the device.

In some embodiments, a somatic representation associated with the selected digital element is determined. In some embodiments, determining the somatic representation includes determining a tactile/haptic feedback to be produced in an augmented reality world to indicate a presence of a digital element at a location. In some embodiments, determining the somatic representation includes scaling and/or modifying a tactile/haptic representation of the selected digital element based on a relative location of the digital element with respect to a distance and/or orientation of a device to render the somatic representation. For example, an intensity and/or pattern of the tactile/haptic representation may be increased as the digital element is located relatively closer to the device, and the intensity and/or pattern of the tactile/haptic representation may be decreased as the digital element is located relatively further away from the device.

At 608, a rendering location associated with each of the one or more selected digital elements is determined. In some embodiments, determining the rendering location of a selected digital element includes determining a screen placement location of the selected digital element within a displayed augmented reality world view. In some embodiments, each of the selected digital elements is associated with a horizontal heading and a vertical heading that have been determined based on a placement location of the element with respect to a detected location of a viewing device.

In order to place the selected visual representation of the digital element, a display displaying the augmented reality environment is divided/mapped/labeled into screen locations identified by horizontal and vertical heading coordinates (e.g., within horizontal and vertical field of view ranges of the device from a horizontal and vertical heading pointed by an orientation of the viewing device). For example, a horizontal heading and a vertical heading pointed by the orientation of the device are set as the center of the displayed augmented reality world view with reference to the perpendicular heading coordinate axis radiating out from the center in both the horizontal and vertical directions (e.g., respective ends of the axis at the edges of the displayed augmented reality world view correspond to ends of field of view range of the device). A selected representation of the digital element may be placed in this axis corresponding to its determined horizontal and vertical headings. In one example, a camera of a device with a 30 degree horizontal angle of view is pointing towards horizontal bearing direction of 150 degrees (i.e., the horizontal axis of the augmented reality world view is divided from 135 degrees to 165 degrees), and the camera has a 40 degree vertical angle of view and is pointing towards vertical bearing direction of 45 degrees (i.e., the vertical axis of the augmented reality world view is divided from 25 degrees to 65 degrees).

In some embodiments, a tilt angle/direction is utilized instead of the vertical heading when determining the placement location of the digital element. In some embodiments, the location associated with the digital element is dynamically modified. For example, a region associated with the digital element becomes smaller and/or larger based at least in part on a time value, an elapsed time, a number of times the digital element has been obtained, and/or any other changing factor. In another example, the digital element's placement location is changed due to movement of the digital element and/or movement of the device used to explore the augmented reality world. In some embodiments, in order to stabilize a location of a digital element, the digital element's placement location is not modified due to change in detected location of the device.

At 610, the determined visual representation of the digital element is rendered over the determined world view. In some embodiments, rendering the visual representation includes superimposing the selected visual representation of the digital element (e.g., appropriately scaled/skewed following visual perspective rules based on a distance between a viewing device and digital element location) at the appropriate determined location on the determined world view corresponding to the location of the digital element (e.g., a selected representation of the digital element may be placed at its corresponding horizontal and vertical headings on a heading coordinate axis dividing/mapping/labeling locations on viewing device display). The created augmented reality view displays the digital element as being placed within the augmented reality world. As the device moves closer to the location of the digital element, the visual representation of the digital element may be scaled (e.g., to become larger) to follow visual perspective rules in creating an illusion that the user is approaching the digital element. The digital element may be animated to allow the digital element to move in the augmented reality world view. In some embodiments, the rendering of the digital element is associated with an audio, tactile and/or other somatosensory feedback. For example, an audio, tactile and/or other somatosensory feedback may be provided via the device to indicate the digital element.

Figure 7:
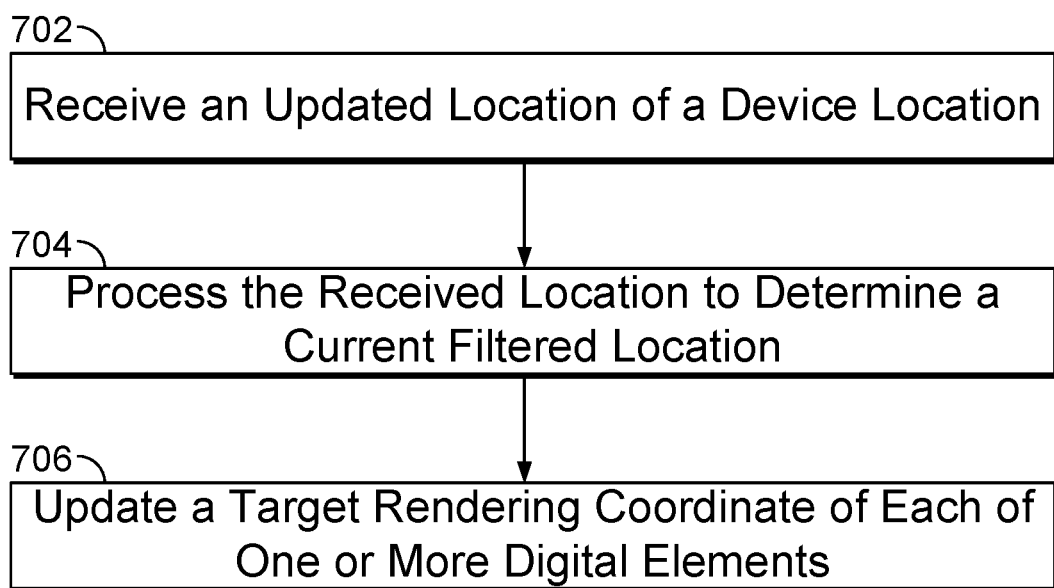
FIG. 7 is a flowchart illustrating an embodiment of a process for updating a target location of a digital element.

FIG. 7 is a flowchart illustrating an embodiment of a process for updating a target location of a digital element. In some embodiments, the process of FIG. 7 is at least in part included in step 504 of FIG. 5. In some embodiments, the process of FIG. 7 triggers the process of FIG. 6. The process of FIG. 7 may be at least in part implemented in device 102 of FIG. 1. In some embodiments, the process of FIG. 7 may be repeated at a periodic interval. In some embodiments, the process of FIG. 7 may be repeated dynamically (e.g., when a new location of a viewing device is detected, etc.).

At 702, an updated location of a device location is received. In some embodiments, receiving the updated location includes determining a physical location of a device that is to be used to explore an augmented reality environment that includes one or more digital elements. For example, determining the physical location includes determining the physical location of device 102 of FIG. 1. In some embodiments, receiving the location includes automatically determining a location using one or more of the following: GPS data, an IP address, Wi-Fi positioning data, cellular signal positioning data, a captured image (e.g., machine vision utilizing visual pattern matching to determine location), a captured audio, and a user provided location identifier. In some embodiments, receiving the location includes receiving an updated location from a location service provided by an operating system. For example, an operating system of device 102 of FIG. 1 provides a location identifier determined using one or more sensors of device 102. The provided location may be already processed to minimize errors of the location. For example, the operating system may provide a location that has been already processed using dead reckoning. Despite this and other processing, the provided location may be unstable and will fluctuate due to detection errors. In some embodiments, the device is being used to display an augmented reality world view rendered in 610 of FIG. 6.

At 704, the received location is processed to determine a current filtered location. Because the received location may be unreliable and fluctuate due to detection errors, the received location may be filtered to determine a filtered location coordinate in attempting to smooth fluctuations of the locations. In some embodiments, a box filter is utilized to average the updated location with one or more other previously received updated locations. In some embodiments, the received updated location is averaged with a predetermined number of last consecutively detected/received location identifiers (e.g., average last five location coordinates received at a periodic interval from a location service) to determine the current filtered location. For example, each location coordinate component is averaged across a predetermined number of latest received location coordinates. In an alternative embodiment, the received location is not processed and the received location is set as the current filtered location.

In some embodiments, determining the current filtered location includes determining whether a difference between the received updated location of the device and a previously received location of the device differs by a threshold amount. For example, if the difference is at or below the threshold (e.g., threshold associated with a maximum rate of change), the received updated location is set as the current filtered location and if the difference is above the threshold, the received updated location may be averaged with another previously received location and/or modified so that the difference is at or below the threshold. In another example, if the difference is at or below the threshold (e.g., threshold associated with significant intentional device movement), the received updated location may be averaged with another previously received location, and if the difference is above the threshold, the received updated location is set as the current filtered location (e.g., no need to smooth because significant movement is due to device movement rather than location detection error). In some embodiments, the threshold is dynamically determined based at least in part on a type of the digital object, a size of a visual representation of the digital object, and/or a distance between a location of the digital object and the received updated location of the device.

At 706, a target rendering coordinate of each of one or more digital elements is updated. In some embodiments, determining the target rendering coordinate includes determining a directional heading/bearing (e.g., horizontal and/or vertical headings) and a distance between a location of a digital element and the determined current filtered location. In some embodiments, the one or more digital elements are digital elements received at 508 of FIG. 5 and/or selected at 604 of FIG. 6. In some embodiments, the target rendering coordinate is a target goal rendering location where the digital element is to be placed. For example, the digital element is rendered at a current rendering location coordinate and the digital element is to be moved/animated towards the target rendering coordinate.

In some embodiments, determining the directional heading for each of the one or more digital elements includes determining a horizontal directional heading/bearing. For example, a compass directional bearing in the plane of the earth horizon (e.g., numerical degree, compass direction, etc.) from the current filtered location to the placement location (e.g., latitude/longitude) of the digital element (e.g., determined in 306 of FIG. 3) is determined. In some embodiments, determining the directional heading for each of the one or more digital elements includes determining a vertical heading/bearing pointed by the orientation of the device. For example, a vertical directional bearing (e.g., numerical degree, etc.) in the plane perpendicular to the earth horizon from the height/altitude of the filtered current location to the height/altitude location of the digital element is determined. The height/altitude of the filtered location may be an altitude of the device at least in part detected using a sensor (e.g., GPS) or a preset default reference height (e.g., set as reference height of zero). The height/altitude location of the digital element may be an altitude or tilt of the device at least in part detected using a sensor (e.g., detected at 306 of FIG. 3) or a predetermined reference height offset from the height/altitude of the filtered location (e.g., three feet above the height/altitude of the filtered location).

In an alternative embodiment, the target rendering coordinate of each of the one or more digital elements is not updated after it is initially determined. For example, in order to stabilize a rendering location of the digital elements, rendering locations of the digital elements are fixed until a new set of matching digital elements is requested (e.g., requested again at 506 of FIG. 5).

Figure 8:
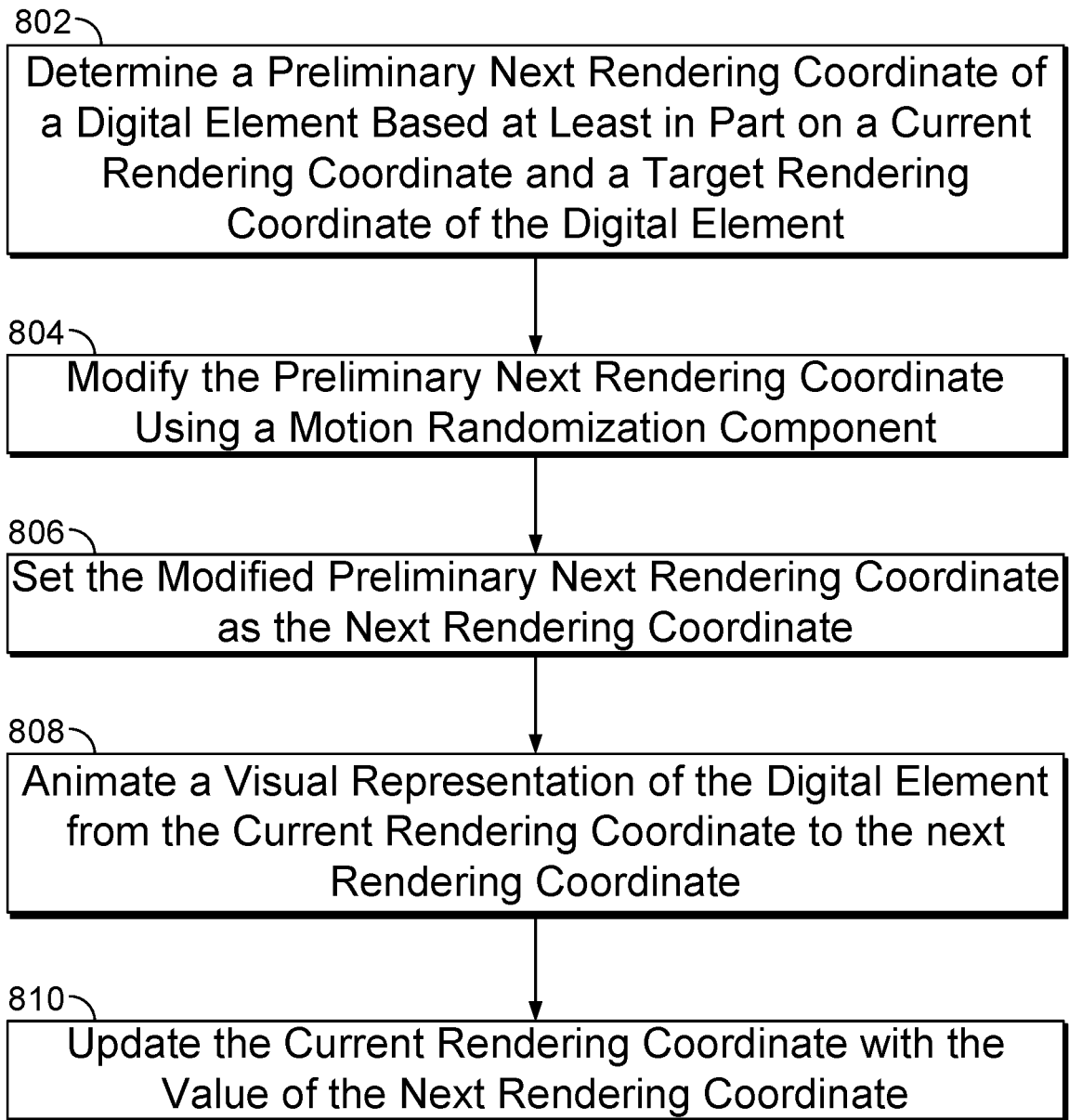
FIG. 8 is a flowchart illustrating an embodiment of a process for determining a next rendering location of a digital element.

FIG. 8 is a flowchart illustrating an embodiment of a process for determining a next rendering location of a digital element. In some embodiments, the process of FIG. 8 is at least in part included in step 610 of FIG. 6. In some embodiments, the process of FIG. 7 triggers the process of FIG. 8. The process of FIG. 8 may be at least in part implemented in device 102 of FIG. 1. In some embodiments, the process of FIG. 8 may be repeated at a periodic interval. In some embodiments, the process of FIG. 8 may be repeated dynamically (e.g., when a new target rendering coordinate is determined for a digital element, etc.).

At 802, a preliminary next rendering coordinate of a digital element is determined based at least in part on a current rendering coordinate and a target rendering coordinate of the digital element. In some embodiments, the target rendering coordinate of the digital element is the target rendering coordinate updated in 706 of FIG. 7. In some embodiments, the current rendering coordinate is associated with a location where a visual representation of the digital element is currently placed within an augmented reality environment. For example, the current rendering coordinate includes a directional heading/bearing (e.g., horizontal and/or vertical headings) and a distance between a location of the digital element and a current location of a viewing device that indicate a rendering location of a visual representation of the digital element.

In some embodiments, a visual representation of the digital element is to be eventually visually animated towards the target rendering coordinate. For example, the rendering coordinate of the digital element may be specified relative to a current location of a viewing device and if the current location of the viewing device changes (e.g., due to location sensor error and/or physical movement of the viewing device), the rendering location of the digital element needs to be modified to reflect the movement of the viewing device location. However, sudden movement of a visual representation of the digital element to a new rendering location may seem unnatural to a user if the visual presentation jumps from one new location to another. Additionally, a digital element that unpredictably moves around at a fast speed may be difficult for a user to select/capture. Thus, by animating movement of the visual representation of the digital element from its old location to a new location in a controlled manner (e.g., travel speed limited), movement of the visual representation may appear natural and predicable to a user.

In some embodiments, determining the preliminary next rendering coordinate includes determining whether a difference between the current rendering coordinate and the target rendering coordinate differs beyond a threshold. For example, if the difference is at or below the threshold (e.g., threshold associated with a maximum rate of change, maximum coordinate value change, etc.), the preliminary next rendering coordinate is set as the target rendering coordinate and if the difference is above the threshold, the preliminary next rendering coordinate is set by modifying the current rendering coordinate up to the threshold for each component of the preliminary next rendering coordinate such that the preliminary next rendering coordinate is closest to the target rendering coordinate (e.g., preliminary next rendering coordinate is progressing towards the target rendering coordinate at a rate limited by a threshold maximum rate of change). In some embodiments, the target rendering coordinate is set as the preliminary next rendering coordinate regardless of the difference between the current rendering coordinate and the target rendering coordinate.

At 804, the preliminary next rendering coordinate is modified using a motion randomization component. For example, a visual representation of the digital element is desired to appear wavering/hovering (e.g., constantly moving slightly in random directions near the preliminary next rendering coordinate) even if the detected location of a viewing device has not changed. By constantly moving/animating the visual representation of the digital element within the augmented reality environment, a user is informed that the rendered location of the digital element within the augmented reality environment may fluctuate and is subject to change. Thus when the visual representation of the digital element is moved within the augmented reality environment (e.g., due to GPS error, viewing device movement, etc.), the user is not surprised that the visual representation is moving.

In some embodiments, modifying the preliminary next rendering coordinate includes modifying the preliminary next rendering coordinate by adding a Brownian motion component to the preliminary next rendering coordinate. In some embodiments, a directional component of the randomization component is added to a directional component of the preliminary next rendering coordinate. In some embodiments, a distance component of the randomization component is added to a distance component of the preliminary next rendering coordinate. In some embodiments, determining the motion randomization component includes utilizing the current rendering coordinate and the preliminary next rendering coordinate. For example, a random factor portion of a difference between the current rendering coordinate and the preliminary next rendering coordinate is utilized in determining the randomization component. In some embodiments, the randomization component is determined using a random number generator. In some embodiments, the randomization component is limited in magnitude. For example, the randomization component is proportional to the difference between the current rendering coordinate and the preliminary next rendering coordinate.

At 806, the modified preliminary next rendering coordinate is set as the next rendering coordinate. For example, the resulting preliminary next rendering coordinate modified in 804 is set as the next rendering coordinate. In some embodiments, the next rendering coordinate identifies the next rendering location where a visual representation of the digital element is to be located. For example, the visual representation of the digital element is to be visually moved with movement animation from its current rendering coordinate to the next rendering coordinate. The next rendering coordinate may include a directional heading/bearing (e.g., horizontal and/or vertical headings) and a distance between a location of the next rendering coordinate and a current location of a viewing device.

At 808, a visual representation of the digital element is animated from the current rendering coordinate to the next rendering coordinate. In some embodiments, animating the visual representation includes visually moving the visual representation within an augmented reality environment. For example, the visual representation of the digital element is rendered over a determined world view (e.g., world view determined in 602 of FIG. 6) in successively different appropriate locations (e.g., appropriately scaled/skewed following visual perspective rules based on a distance between a viewing device and digital element location) on the determined world view corresponding to the travel path from the current rendering coordinate to the next rendering coordinate. In some embodiments, animating the visual representation using cubic interpolation and/or other interpolation-based animation to animate movement of the visual representation from the current rendering coordinate to the next rendering coordinate is used.

At 810, the current rendering coordinate is updated with the value of the next rendering coordinate. For example, because the visual representation of the digital element has been animated to the next rendering coordinate, the next rendering coordinate becomes the current rendering coordinate of the digital element. In some embodiments, the process of FIG. 8 returns to 802 and the process of FIG. 8 is repeated. For example, the process of FIG. 8 may be repeated at a periodic interval with each successive next rendering coordinate becoming the current rendering location. The target rendering coordinate of the digital element may be dynamically changing and each successive iteration of the process of FIG. 8 may use the updated target rendering coordinate.

Figure 9:
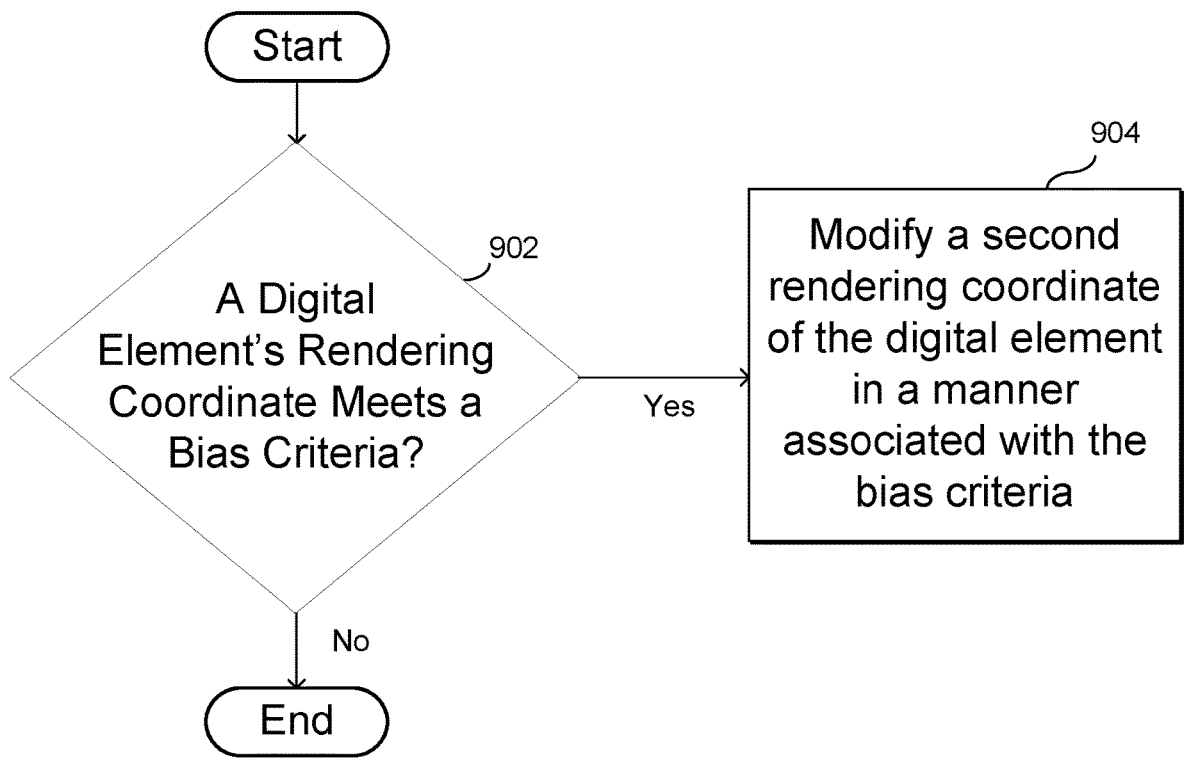
FIG. 9 is a flowchart illustrating an embodiment of a process for biasing a rendering coordinate of a digital element.

FIG. 9 is a flowchart illustrating an embodiment of a process for biasing a rendering coordinate of a digital element. In some embodiments, the process of FIG. 9 is at least in part included in step 610 of FIG. 6, 706 of FIG. 7 and/or 806 of FIG. 8. In some embodiments, the process of FIG. 9 triggers the process of FIG. 8 to be paused and/or not executed. The process of FIG. 9 may be at least in part implemented in device 102 of FIG. 1. In some embodiments, the process of FIG. 9 may be repeated at a periodic interval. In some embodiments, the process of FIG. 9 may be repeated dynamically (e.g., when an orientation/location of a viewing device is changed, etc.).

At 902, it is determined whether a digital element's rendering coordinate meets a bias criteria. In some embodiments, the digital element is the digital element rendered in 610 of FIG. 6. It may be desired to bias a rendering coordinate of the digital element to allow the digital element to be more easily selected by a user. For example, due to errors of determining an exact location of a viewing device, a visual representation of the digital element rendered using the rendering coordinate specified relative to a location of the viewing device may be moving within an augmented virtual reality environment. A user may select/capture the digital element to obtain additional digital content associated with the digital element by touching the visual representation displayed on a screen of the viewing device and/or orientating the view device such that a selection aim area (e.g., stationary crosshairs displayed on the center of the display screen of the view device) is placed over the digital element for at least a predetermined amount of time. However, if the visual representation is moving on the screen due to the fluctuations in the detected physical location of the view device, it may be difficult for the user to select the visual representation and/or orient the view device quickly enough to keep the moving visual representation within the selection aim area and/or touch the visual representation.

In some embodiments, determining whether the rendering coordinate meets the bias criteria includes determining whether the digital element has been indicated by a user. For example, it is determined whether a visual representation of the digital element has been indicated with a touch selection input on a touch input screen of a viewing device. In another example, it is determined whether a visual representation of the digital element is within a selection aim area of a display of the viewing device (e.g., determine whether a center of the visual representation is currently placed within a displayed outlined area where the associated digital element is captured after the visual representation is placed within the area for a predetermined amount of time).

In some embodiments, the rendering coordinate includes a directional component (e.g., a horizontal/vertical directional heading/bearing) and a distance component (e.g., distance between a location of the digital element and a current location of a viewing device). In some embodiments, determining whether the rendering coordinate meets the bias criteria includes determining whether a directional component of the rendering coordinate is within a determined range. For example, it is determined whether the heading of the rendering coordinate is within a threshold range (e.g., field of view range determined in 604 of FIG. 6) from a current heading of a viewing device (e.g., current heading determined in 602 of FIG. 6). By determining whether the heading of the rendering coordinate and the heading of the viewing device is within a threshold difference, it may be determined whether the viewing device is pointing towards (e.g., selecting aiming area is at the horizontal center of the screen of a viewing device) the rendering coordinate of the digital element. In another example, it is determined whether the visual representation of the digital element is being displayed on a screen of the viewing device by determining whether the directional component of the rendering coordinate is within the field of view of headings being displayed on the screen (e.g., headings included in field of view range determined in 604 of FIG. 6).

If at 902 it is determined that the digital element's rendering coordinate meets a bias criteria, at 904, a second rendering coordinate of the digital element is modified in a manner associated with the bias criteria. The second rendering coordinate may be the target rendering coordinate determined in 706 of FIG. 7 and/or the next rendering coordinate determined in 806 of FIG. 8.

In some embodiments, modifying the second rendering coordinate includes biasing a directional component of the next rendering coordinate using a detected current heading (e.g., detected at 602 of FIG. 6) of a viewing device. For example, it is desired for a visual representation of the digital element to remain within the directional headings viewable in the angle of view of the viewing device by biasing the second rendering location of the visual representation of the digital element to be moved towards the center of directional heading pointed by the viewing device. Biasing the directional component of the second rendering coordinate using the detected current heading may include setting the direction component of the second rendering coordinate as a weighted sum of the original direction component of the second rendering coordinate and the directional heading pointed by the viewing device.

In some embodiments, modifying the second rendering coordinate includes biasing a directional component of the second rendering coordinate using a directional heading associated with a selection aim area displayed on a viewing device. For example, it is desired for a visual representation of the digital element to remain within the selection aim area by biasing the second rendering location of the visual representation of the digital element to remain/move towards the center of selection aim area. Biasing the directional component of the second rendering coordinate using the directional heading associated with a selection aim area may include setting the direction component of the second rendering coordinate as a weighted sum of the original direction component of the second rendering coordinate and the current directional heading where the selection aim area is located.

In some embodiments, modifying the second rendering coordinate of the digital element includes not updating the second rendering coordinate of the digital element and allowing the digital element to remain in its current rendering location. For example, at 904, the next rendering coordinate in 806 of FIG. 8 is modified to be the current rendering coordinate rather than the modified preliminary next rendering coordinate. In another example, at 904, the process of FIG. 8 is paused/stopped until the digital element no longer meets the bias criteria. In another example, at 904, the target rendering coordinate in 706 of FIG. 7 is modified to be not updated in 706.

If at 902 it is determined that the digital element's rendering coordinate does not meet the bias criteria, the process ends. The process may return to 902. For example, the process of FIG. 9 may be repeated at a periodic interval and/or dynamically (e.g., when an orientation and/or location of a viewing device is updated).

Figure 10:
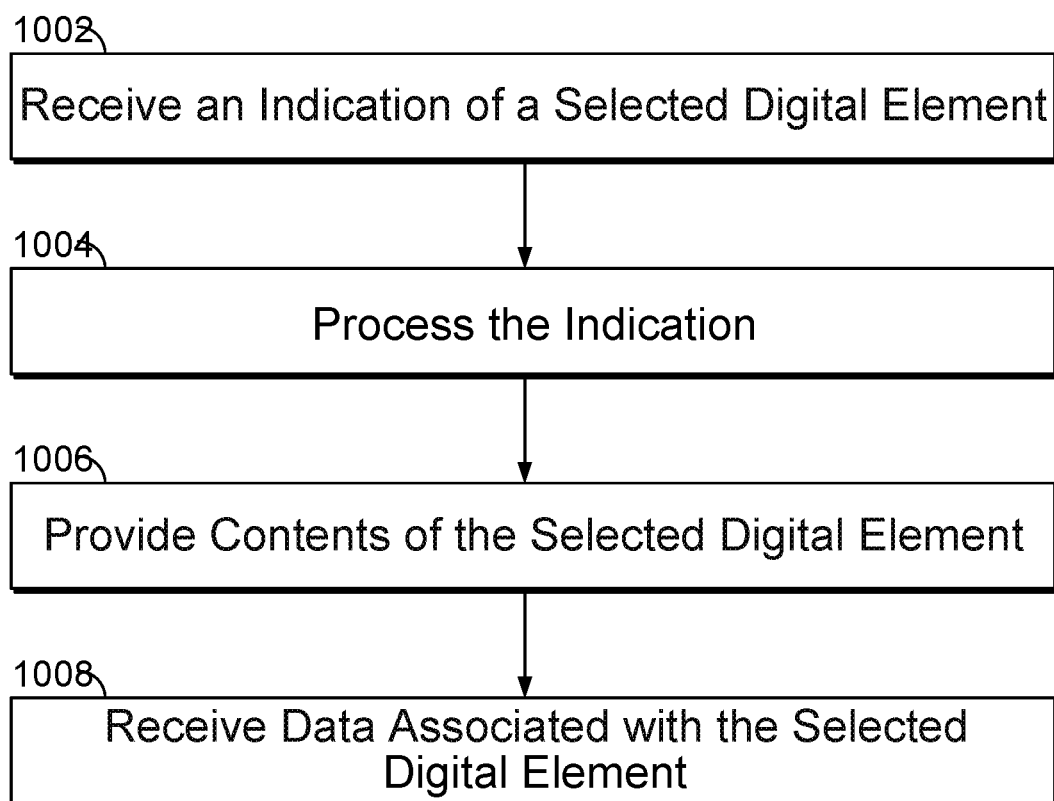
FIG. 10 is a flowchart illustrating an embodiment of a process for retrieving a rendered digital element.

FIG. 10 is a flowchart illustrating an embodiment of a process for retrieving a rendered digital element. The process of FIG. 10 may be at least in part implemented in device 102 and/or sever 106 of FIG. 1. In some embodiments, the process of FIG. 10 is used at least in part to obtain content of a digital element rendered in an augmented reality view. For example, the process of FIG. 6 is used to provide a rendered view of a digital element that may be obtained. In some embodiments, although a visual representation of a digital element can be seen on a display screen, the digital element may not be able to be obtained until the device is closer to a location of the digital element. For example, as the device is moved closer to the location of the digital element, a visual, sonic and/or somatic representation of the digital element becomes larger. In some embodiments, when the digital element is able to be obtained, an indication is provided. For example, the visual representation may blink, glow, pulsate, and/or change color to indicate that the element can be obtained. In some embodiments, the device may vibrate and/or emit a sound to indicate that the element can be obtained.

At 1002, an indication of a selected digital element is received. In some embodiments, a displayed digital element that is able to be obtained may be selected to be obtained by providing a gesture input. For example, a visual representation of a digital element that is displayed in an augmented reality view may be selected by a user to be obtained at least in part by touching the visual representation on a touch screen display. In some embodiments, a user may perform a movement/gesture (e.g., detected using an accelerometer, orientation sensor, compass, and/or gyroscope) with a device rendering the digital element to select a digital element to be obtained. For example, a user may be required to swing the device in a semicircular motion to act out capturing the rendered digital element. In another example, a user may be required to rub the visual representation of the desired digital element displayed on a touchscreen surface to act out scratching a scratch card to reveal the digital element contents.

In some embodiments, a user may capture a digital element by hovering over the digital object for a preset amount of time. For example a center of a display of a viewing device (e.g., device 102 of FIG. 1) displays a target selection area (e.g., cross hairs) and when the digital object is aimed in the target selection area for at least a predetermined amount of time, the digital object is indicated to be retrieved/captured. In some embodiments, a user may indicate to retrieve/capture a digital element by touching and/or holding (e.g., for a predetermined amount of time) the digital object on a touch input screen of the device. For example, a user may touch a rendered digital object on a display of a viewing device to retrieve/capture the digital object. In some embodiments, because the rendered location of the digital element may be unstable and change over time due to errors and limitations of using a sensor to detect the device location, it may be difficult to indicate a moving digital object. The process of FIG. 9 may be utilized to stabilize the digital element.

At 1004, the indication is processed. In some embodiments, processing the indication includes determining an identifier of the selected digital element. In some embodiments, processing the indication includes determining how and/or where to obtain contents of the selected digital element. In some embodiments, processing the digital element includes modifying and/or storing data associated with the digital element to indicate that the digital element has been retrieved by a specified user. In some embodiments, processing the digital element includes verifying that the selected digital element is allowed to be obtained by the user. In some embodiments, processing the indication includes obtaining contents of the selected digital element. In some embodiments, the contents may be obtained from a storage such as storage 112 and/or storage 114 of FIG. 1.

At 1006, contents of the selected digital element are provided. In some embodiments, providing the contents includes displaying text, image, video, and/or other content associated with the digital element. In some embodiments, providing the contents includes displaying the contents using the application used to render the visual representation of the selected digital element. In some embodiments, providing the contents includes opening the contents using a different application than the application used to render the visual representation of the selected digital element. For example, the contents include a spreadsheet file and the spreadsheet file is opened using a spreadsheet application.

At 1008, data associated with the selected digital element is received. In some embodiments, data such as utilization statistics, utilization behavior, and other utilization metrics associated with provided contents of the digital element and/or other data of the digital element is received at a server such as server 106 of FIG. 1. In some embodiments, the received data may be used to research utilization behavior. In some embodiments, the provided data is used to update configurations associated with the selected digital element. For example, the selected digital element can be accessed a limited number of times and the configuration that tracks the number of times the digital element has been accessed is updated using the received data.

Figure 11A:
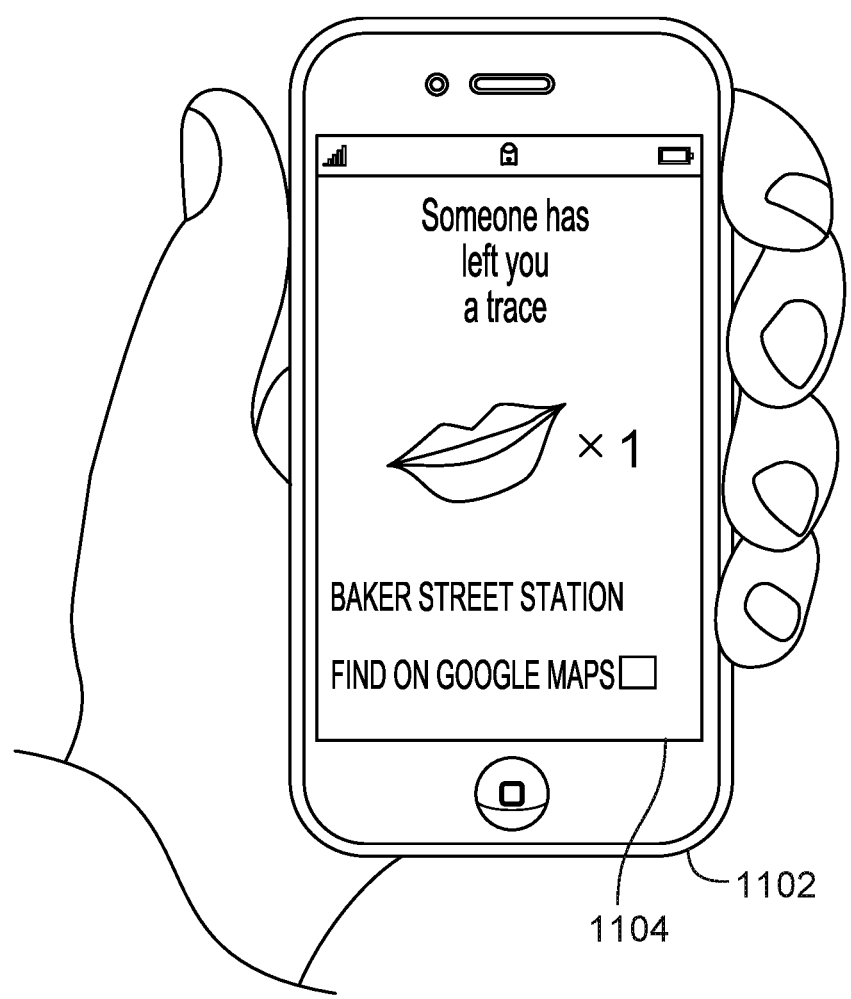
FIGS. 11A-11C are diagrams illustrating an example user interface used to retrieve a digital element.
Figure 11B:
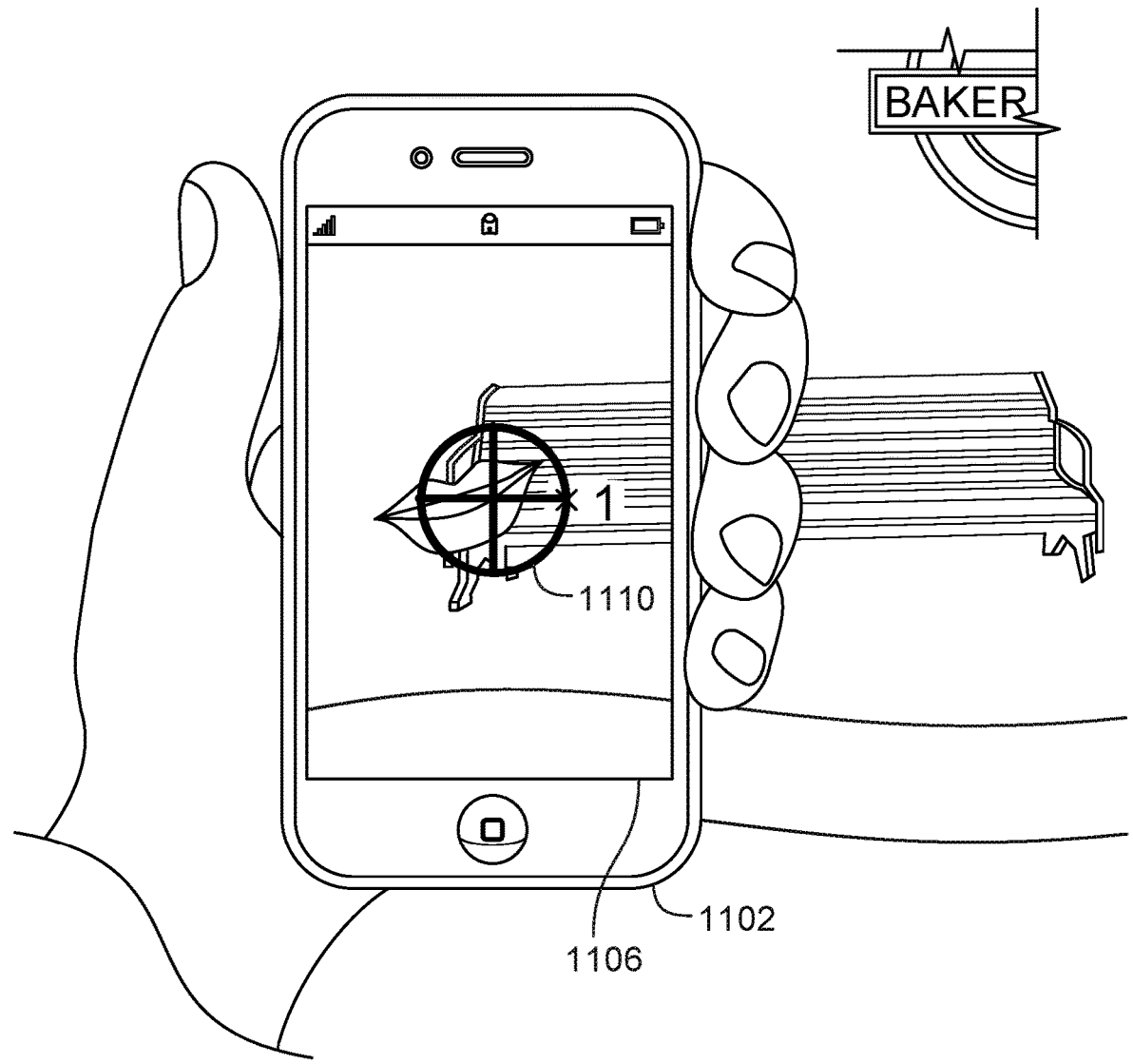
Figure 11C:
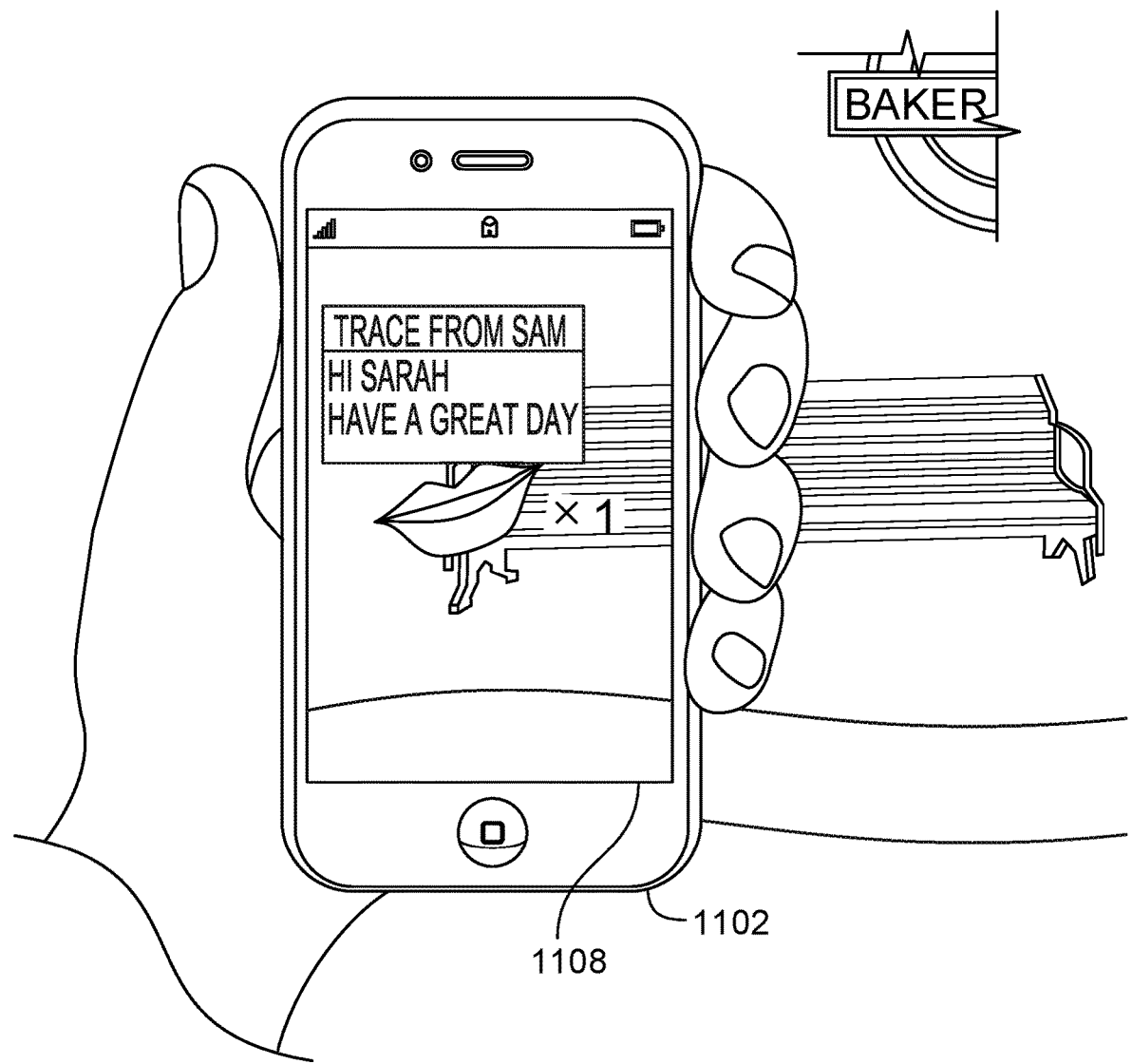

FIGS. 11A-11C are diagrams illustrating an example user interface used to retrieve a digital element. In some embodiments, FIGS. 11A-11C illustrate at least a portion of the processes of FIGS. 5-10. FIG. 11A shows a user holding device 1102 that is running an application that can be used to render and retrieve a digital element. In some embodiments, device 1102 is device 102 of FIG. 1. Screen 1104 is displaying a notification that another person has placed a "KISS" digital element (e.g., trace) at the "Baker Street Station" location for the user of device 1102. In some embodiments, the notification shown in screen 1104 is provided with an audio, tactile and/or other somatosensory notification. In some embodiments, the notification shown in screen 1104 was provided when the digital element was placed. In some embodiments, the notification shown in screen 1104 was provided when device 1102 was within a specified distance from the placement location of the digital element. FIG. 11B shows screen 1106 that is displaying an augmented reality view of the "Baker Street Station" location where the digital element was placed. In screen 1106, a visual representation of the digital element is rendered on top of a world view of the "Baker Street Station" location captured using a camera of device 1102. The "KISS" digital element may be indicated to be captured by the user by touching the digital element, touching the digital element for a predetermined amount of time, and/or aiming/placing the digital element within selection aim area 1110 for a predetermined amount of time. FIG. 11C shows screen 1108 that is displaying text message content of the digital element after a user of device 1102 has performed a gesture to indicate that the user desires to obtain contents of the displayed digital element.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
   determining a geographical location of a user device;
   determining that the geographical location of the user device matches a digital element based on a distance difference between the geographical location of the user device and a geographical location of the digital element;

in response to the determination that the geographical location of the user device matches the digital element, providing an indication that the digital element is selectable;

providing to a user a representation of the digital element without providing an auditory content of the digital element, including by providing a sonic representation of the digital element that indicates a sonic presence of the digital element virtually located at a real world location corresponding to the geographical location of the digital element as a digitally obtainable object having the auditory content that is different from the sonic representation but not provided to the user prior to being obtained, wherein the sonic representation is provided including by performing an audio scaling or a modification based on a relative distance and an orientation between the geographical location of the user device and the real world location of the digital element;

receiving a user selection indication that selects the representation of the digital element to obtain the auditory content of the digital element; and providing the auditory content of the digital element based at least in part on receiving the user selection indication.

2. The method of claim 1, wherein providing the representation of the digital element includes providing the representation of the digital element using augmented reality.

3. The method of claim 1, wherein providing the representation of the digital element includes generating an augmented reality representation of the digital element in a rendered view of at least a portion the geographical location of the digital element.

4. The method of claim 1, wherein the auditory content of the digital element is specified to be not obtainable when the distance difference between the geographical location of the user device and the geographical location of the digital element is greater than a threshold distance.

5. The method of claim 1, further comprising receiving the digital element from a server at least in part in response to sending an identifier of the geographical location of the user device to the server.

6. The method of claim 1, wherein the auditory content of the digital element is specified to be only accessible by one or more specified users.

7. The method of claim 1, wherein the auditory content of the digital element was provided by a first user for another user.

8. The method of claim 1, wherein the auditory content of the digital element is private to a single user.

9. The method of claim 1, wherein the auditory content of the digital element is associated with a restriction based at least in part on a number of times the auditory content is allowed to be accessed.

10. The method of claim 1, wherein the auditory content of the digital element is associated with a restriction based at least in part on a time when the auditory content of the digital element is allowed to be accessed.

11. The method of claim 1, wherein the auditory content of the digital element is associated with a restriction based at least in part on a status associated with the geographical location of the digital element.

12. The method of claim 1, wherein the digital element is selectable within a predetermined distance from the geographical location of the digital element.

13. The method of claim 1, wherein providing the indication that the digital element is selectable includes providing a sonic indication.

14. The method of claim 1, wherein performing the audio scaling or modification includes modifying a tone of the sonic representation.

15. The method of claim 1, wherein providing the representation of the digital element includes providing a somatic representation of the digital element.

16. The method of claim 15, wherein the somatic representation is determined including by scaling or modifying a tactile or a haptic representation based on the relative distance and the orientation between the geographical location of the user device and the real world location of the digital element.

17. The method of claim 1, wherein providing the representation of the digital element includes using an image captured using a camera of the user device.

18. The method of claim 1, wherein providing the indication that the digital element is selectable includes providing a notification.

19. A system, comprising:
one or more processors configured to:
determine a geographical location of a user device;
determine that the geographical location of the user device matches a digital element based on a distance difference between the geographical location of the user device and a geographical location of the digital element;
in response to the determination that the geographical location of the user device matches the digital element, provide an indication that the digital element is selectable;
provide to a user a representation of the digital element without providing an auditory content of the digital element, including by being configured to provide a sonic representation of the digital element that indicates a sonic presence of the digital element virtually located at a real world location corresponding to the geographical location of the digital element as a digitally obtainable object having the auditory content that is different from the sonic representation but not provided to the user prior to being obtained, wherein being configured to provide the sonic representation includes being configured to perform an audio scaling or a modification based on a relative distance and an orientation between the geographical location of the user device and the real world location of the digital element;
receive a user selection indication that selects the representation of the digital element to obtain the auditory content of the digital element; and
provide the auditory content of the digital element based at least in part on receiving the user selection indication; and
a memory coupled to at least a portion of the one or more processors and configured to provide at least the portion of the one or more processors with instructions.

20. A computer program product, the computer program product being embodied in a non-transitory computer readable storage medium and comprising computer instructions for:
determining a geographical location of a user device;
determining that the geographical location of the user device matches a digital element based on a distance difference between the geographical location of the user device and a geographical location of the digital element;

in response to the determination that the geographical location of the user device matches the digital element, providing an indication that the digital element is selectable;

providing to a user a representation of the digital element without providing an auditory content of the digital element, including by providing a sonic representation of the digital element that indicates a sonic presence of the digital element virtually located at a real world location corresponding to the geographical location of the digital element as a digitally obtainable object having the auditory content that is different from the sonic representation but not provided to the user prior to being obtained, wherein the sonic representation is provided including by performing an audio scaling or a modification based on a relative distance and an orientation between the geographical location of the user device and the real world location of the digital element;

receiving a user selection indication that selects the representation of the digital element to obtain the auditory content of the digital element; and providing the auditory content of the digital element based at least in part on receiving the user selection indication.

\* \* \* \* \*